United States Patent
Nishikawa et al.

(10) Patent No.: US 11,729,502 B2
(45) Date of Patent: Aug. 15, 2023

(54) APPARATUS INCLUDING FOCUSING FUNCTION AND METHOD OF THE SAME

(71) Applicant: CANON KABUSHIKI KAISHA, Tokyo (JP)

(72) Inventors: Shun Nishikawa, Tokyo (JP); Takayuki Akaguma, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/723,293

(22) Filed: Apr. 18, 2022

(65) Prior Publication Data

US 2022/0353423 A1 Nov. 3, 2022

(30) Foreign Application Priority Data

Apr. 28, 2021 (JP) ................................ 2021-076751
Apr. 28, 2021 (JP) ................................ 2021-076752

(51) Int. Cl.
- *H04N 5/232* (2006.01)
- *H04N 23/67* (2023.01)
- *H04N 23/63* (2023.01)

(52) U.S. Cl.
CPC ......... *H04N 23/672* (2023.01); *H04N 23/635* (2023.01); *H04N 23/675* (2023.01)

(58) Field of Classification Search
CPC ....... H04N 5/232945; H04N 5/232122; H04N 5/232127
USPC ...................................................... 348/319
See application file for complete search history.

(56) References Cited

U.S. PATENT DOCUMENTS

| | | | | |
|---|---|---|---|---|
| 9,912,859 | B2* | 3/2018 | Zhang | G06V 10/751 |
| 10,306,131 | B2* | 5/2019 | Yokozeki | H04N 5/232945 |
| 10,469,730 | B2* | 11/2019 | Kano | H04N 5/23219 |
| 10,516,821 | B2* | 12/2019 | Yokozeki | H04N 5/23218 |
| 11,012,650 | B2* | 5/2021 | Onuki | H04N 5/23229 |
| 11,178,337 | B2* | 11/2021 | Ikeda | H04N 5/36961 |
| 2008/0278587 | A1* | 11/2008 | Izawa | G02B 7/36 |
| | | | | 348/E5.04 |
| 2012/0007997 | A1* | 1/2012 | Oikawa | H04N 5/36961 |
| | | | | 348/208.6 |

(Continued)

FOREIGN PATENT DOCUMENTS

| | | |
|---|---|---|
| JP | 2002207156 A | 7/2002 |
| JP | 5447549 B2 | 3/2014 |
| JP | 2021021857 A | 2/2021 |

*Primary Examiner* — Pritham D Prabhakher
(74) *Attorney, Agent, or Firm* — Canon U.S.A., Inc. IP Division

(57) ABSTRACT

An apparatus includes a device that acquires an image signal by photoelectrically converting a light beam of a subject that has entered via an optical system including a focus lens, a setting unit that sets a first region in the image signal, a focus detection unit that detects a defocus amount for each divided region of a region in the image signal, a detection unit that detects a second region as a region of a specific subject, based on the image signal, and a control unit that controls the focus lens based on the defocus amount of the divided region included in the second region if the first region and the second region overlap, and controls the focus lens based on the defocus amount of the divided region included in the first region if the first region and the second region do not overlap.

23 Claims, 16 Drawing Sheets

(56) References Cited

U.S. PATENT DOCUMENTS

| | | | |
|---|---|---|---|
| 2012/0147252 A1* | 6/2012 | Kunishige | H04N 5/232945 |
| | | | 348/E5.045 |
| 2012/0249846 A1* | 10/2012 | Nishio | H04N 5/36961 |
| | | | 348/E5.045 |
| 2016/0295100 A1* | 10/2016 | Yokozeki | H04N 5/23218 |
| 2017/0289441 A1* | 10/2017 | Zhang | H04N 5/232123 |
| 2017/0353654 A1* | 12/2017 | Kato | G06T 7/74 |
| 2019/0238745 A1* | 8/2019 | Yokozeki | H04N 5/232127 |
| 2019/0373202 A1* | 12/2019 | Onuki | H04N 5/37455 |
| 2021/0037190 A1* | 2/2021 | Ikeda | H04N 5/232127 |
| 2021/0337129 A1* | 10/2021 | Iwasaki | H04N 5/232127 |

* cited by examiner

PLAN VIEW a-a SECTIONAL VIEW

APPARATUS INCLUDING FOCUSING FUNCTION AND METHOD OF THE SAME

BACKGROUND

Technical Field

The aspect of the embodiments relates to an imaging apparatus including a focusing function.

Description of the Related Art

A technique of arbitrary selection autofocus (AF) for focusing on an arbitrary region (AF frame) in an image capturing screen represented by a rectangle has been conventionally used as means of selecting a region to be brought into focus.

In the arbitrary selection AF, an arbitrary subject on which a user desires to focus can be brought into focus even in a case where a plurality of subjects such as humans exists in the image capturing screen, by setting a position and a size of an AF frame in such a manner that the AF frame includes the subject on which the user desires to focus. Alternatively, the arbitrary subject on which the user desires to focus can be brought into focus by moving the imaging apparatus itself so that the subject is included in a preset AF frame.

Nevertheless, in the case of capturing an image of a subject moving swiftly, it is difficult to continuously keep a proper position of an arbitrarily-set AF frame with respect to an imaging target subject desired by the user, and the subject sometimes goes out of focus.

In contrast, in a case where an obstacle gets within the AF frame, the obstacle is brought into focus, and the in-focus position fails to match an intended position.

The technique discussed in Japanese Patent Application Laid-Open No. 2002-207156 includes a function of detecting defocus from a range wider than a predetermined region. By performing clustering based on a value of the defocus, and determining whether an obstacle subject exists near the outer periphery of the predetermined region, lens control is performed in such a manner as not to put a focus on the obstacle.

The technique discussed in Japanese Patent No. 5447549 includes a subject recognition function. In a case where a defocus amount obtained from a subject recognition region is equal to or smaller than a predetermined amount, a subject is brought into focus by controlling a focus lens using the defocus amount. On the other hand, in a case where a defocus amount obtained from a subject recognition region is equal to or larger than a predetermined amount, focus lens control is performed using a defocus amount obtained from a region such as an AF frame that is other than the subject recognition region. As a technique of displaying an image capturing screen, Japanese Patent Application Laid-Open No. 2021-21857 discusses a technique of hiding an AF frame and displaying a frame indicating a subject recognition region, in a case where a defocus amount obtained from the subject recognition region is equal to or smaller than a predetermined amount, similarly to the technique discussed in Japanese Patent No. 5447549. On the other hand, in a case where a defocus amount obtained from the subject recognition region is equal to or larger than a predetermined amount, the technique displays the AF frame and hides the frame indicating the subject recognition region.

The conventional technique discussed in Japanese Patent Application Laid-Open No. 2002-207156, however, can raise an issue that, in a case where framing fails and a correct subject exists near the outer periphery of a predetermined region, the position of the subject cannot be selected as a position to be brought into AF, and focusing is made at a different position.

In the conventional techniques discussed in Japanese Patent No. 5447549 and Japanese Patent Application Laid-Open No. 2021-21857, there are some cases that even when the user desires to focus on an arbitrary subject using an AF frame, another subject that is not intended by the user is recognized, and the subject intended by the user cannot be brought into focus. This is because, in a case where a defocus amount obtained from a subject recognition region of the subject unintended by the user is small, a frame indicating the subject recognition region is displayed with the AF frame hidden, and a focus lens is controlled using the defocus amount obtained from the subject recognition region. Meantime, in a case where the arbitrary selection AF is performed without using the conventional techniques for avoiding the aforementioned situation, it is necessary to continuously keep capturing the subject on which the user desires to focus precisely within the AF frame. Nevertheless, in a case where the subject falls outside the AF frame due to a reason that the size of the subject is so small or the subject is moving so fast, the subject cannot be brought into focus.

SUMMARY

According to an aspect of the embodiments, an apparatus includes a device configured to acquire an image signal by photoelectrically converting a light beam of a subject that has entered via an optical system including a focus lens, a setting unit configured to set a first region in the image signal, a focus detection unit configured to detect a defocus amount for each of divided regions obtained by dividing a region in the image signal into a plurality of regions, a detection unit configured to detect a second region as a region of a specific subject, based on the image signal, and a control unit configured to control the focus lens based on the defocus amount included in the second region in a case where the first region and the second region overlap, and configured to control the focus lens based on the defocus amount included in the first region in a case where the first region and the second region do not overlap.

According to another aspect of the embodiments, there can be provided a method of bringing a subject into focus without precisely setting an autofocus (AF) frame on a subject that a user desires to focus on, in an apparatus including an automatic focusing function.

Further features of the disclosure will become apparent from the following description of exemplary embodiments with reference to the attached drawings.

DESCRIPTION OF THE EMBODIMENTS

The disclosure will now be described in detail below with reference to the accompanying drawings showing embodiments thereof. Nevertheless, configurations described in the following exemplary embodiments are mere examples, and the scope of the disclosure is not limited by the configurations described in the exemplary embodiments.

Configuration of Imaging Apparatus

Figure 1:
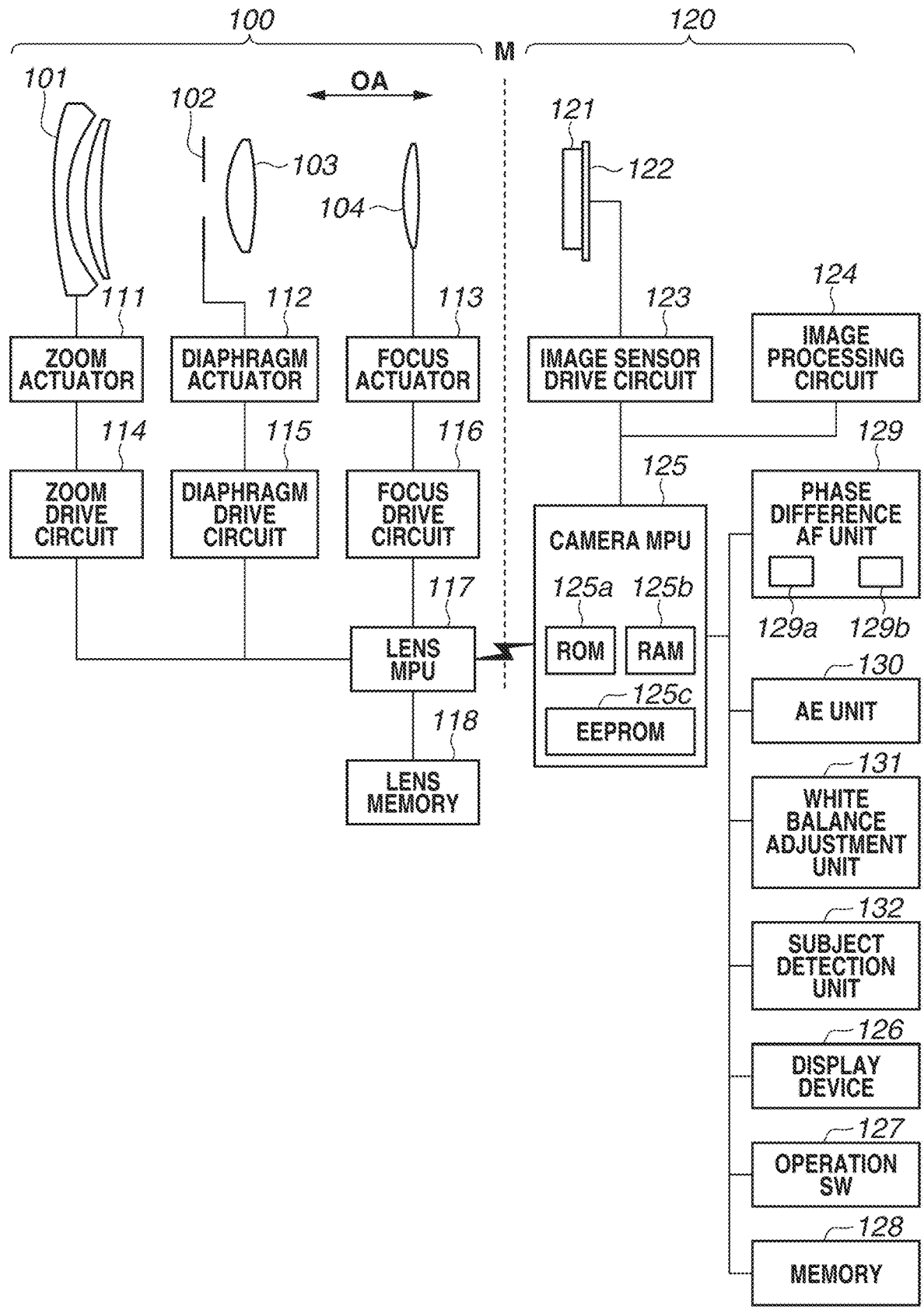
FIG. 1 is a block diagram illustrating an imaging apparatus according to an exemplary embodiment of the disclosure.

Hereinafter, a first exemplary embodiment will be described. FIG. 1 is a diagram illustrating an example of a camera system 10 serving as an imaging apparatus according to an exemplary embodiment of the disclosure. The camera system 10 is an interchangeable single-lens reflex type digital camera. The imaging apparatus may be a type of a camera (digital camera or video camera in which a lens unit and a camera main body are integrally formed) of which a lens is not interchangeable. The imaging apparatus is not limited to digital cameras, and may be any device such as a smartphone and a tablet terminal.

The camera system 10 is a camera system including a lens unit 100 that is an interchangeable lens, and a camera main body 120 that is an imaging apparatus.

The lens unit 100 is attachable to and detachable from the camera main body 120 via a mount M indicated by a dotted line in FIG. 1.

The lens unit 100 includes a first lens unit 101, a diaphragm 102, a second lens unit 103, and a focus lens unit (hereinafter, will be simply referred to as a "focus lens") 104, which serve as an optical system, and a drive/control system. In this manner, the lens unit 100 is an imaging lens (imaging optical system) that includes the focus lens 104, and forms a subject image.

The first lens unit 101 is arranged at the leading end of the lens unit 100, and held in such a manner as to be movable forward and backward in an optical axis direction OA. The diaphragm 102 adjusts a light amount in image capturing by adjusting an aperture diameter. The diaphragm 102 also functions as a shutter for controlling an exposure time (in seconds) in still image capturing. The diaphragm 102 and the second lens unit 103 are integrally movable in the optical axis direction OA, and implement a zoom function in cooperation with a forward/backward moving operation of the first lens unit 101. The focus lens 104 is movable in the optical axis direction OA. A subject distance (focal distance) at which the lens unit 100 enters an in-focus state varies depending on the position of the focus lens 104. By controlling the position of the focus lens 104 in the optical axis direction OA, focus adjustment (focus control) for adjusting a focal distance of the lens unit 100 can be performed.

The drive/control system includes a zoom actuator 111, a diaphragm actuator 112, a focus actuator 113, a zoom drive circuit 114, a diaphragm drive circuit 115, a focus drive circuit 116, a lens micro processing unit (MPU) 117, and a lens memory 118. The zoom drive circuit 114 drives the first lens unit 101 and the second lens unit 103 in the optical axis direction OA using the zoom actuator 111, and controls a field angle of the optical system of the lens unit 100 (performs a zoom operation). The diaphragm drive circuit 115 drives the diaphragm 102 using the diaphragm actuator 112, and controls the aperture diameter and an opening/closing operation of the diaphragm 102. The focus drive circuit 116 drives the focus lens 104 in the optical axis direction OA using the focus actuator 113, and controls a focal distance of the optical system of the lens unit 100 (performs focus control). The focus drive circuit 116 also includes a function as a position detection unit that detects a current position (lens position) of the focus lens 104 using the focus actuator 113.

The lens MPU 117 controls the zoom drive circuit 114, the diaphragm drive circuit 115, and the focus drive circuit 116 by performing all calculations and control related to the lens unit 100. The lens MPU 117 is connected to a camera MPU 125 via the mount M, and communicates commands and data with the camera MPU 125. For example, the lens MPU 117 detects the position of the focus lens 104, and notifies the camera MPU 125 of lens position information in response to a request from the camera MPU 125. The lens position information includes information such as the position in the optical axis direction OA of the focus lens 104, the position of an exit pupil in the optical axis direction OA and a diameter of the exit pupil in a state in which the optical system is not moved, and the position of a lens frame that restricts light beams of the exit pupil in the optical axis direction OA and a diameter of the lens frame. In response to a request from the camera MPU 125, the lens MPU 117 also controls the zoom drive circuit 114, the diaphragm drive circuit 115, and the focus drive circuit 116. The lens memory 118 stores optical information for automatic focusing (autofocus (AF) control). The camera MPU 125 controls operations of the lens unit 100 by executing programs stored in an embedded nonvolatile memory and the lens memory 118, for example.

The camera main body 120 includes an optical lowpass filter 121, an image sensor 122, and a drive/control system. The optical lowpass filter 121 and the image sensor 122 function as an imaging unit that photoelectrically converts a subject image (optical image) formed via the lens unit 100, and outputs image data. The image sensor 122 photoelectrically converts the subject image formed via the imaging optical system, and outputs an imaging signal and a focus detection signal as the image data. The imaging optical system includes the first lens unit 101, the diaphragm 102, the second lens unit 103, the focus lens 104, and the optical lowpass filter 121.

The optical lowpass filter 121 reduces false color and moire of captured images. The image sensor 122 includes a complementary metal-oxide semiconductor (CMOS) image sensor and a peripheral circuit thereof, and includes m pixels arranged in a horizontal direction and n pixels arranged in a vertical direction (m and n are integers of 2 or more). The image sensor 122 also serves as a focus detection element, and includes a pupil division pixel that has a pupil division function and can perform focus detection (phase difference AF) of a phase difference detection method using image data (image signal). An image processing circuit 124 generates data for phase difference AF, and image data for display, recording and subject detection based on the image data output from the image sensor 122.

The drive/control system includes an image sensor drive circuit 123, the image processing circuit 124, the camera MPU 125, a display device 126, operation switch unit (operation SW) 127, and a memory 128. The drive/control system further includes a phase difference AF unit 129 (imaging plane phase difference focus detection unit, control unit), an autoexposure (AE) unit 130 (control unit), a white balance adjustment unit 131 (control unit), and a subject detection unit 132 (detection unit). The image sensor drive circuit 123 controls operations of the image sensor 122, performs an analog to digital (A/D) conversion on an image signal (image data) output from the image sensor 122, and transmits the converted image signal to the camera MPU 125. The image processing circuit 124 performs general image processing performed in digital cameras, such as y conversion, color interpolation processing, and compression coding processing on the image signal output from the image sensor 122. The image processing circuit 124 also generates a signal for phase difference AF, a signal for AE, a signal for white balance adjustment, and a signal for subject detection. The signal for phase difference AF, the signal for AE, the signal for white balance adjustment, and the signal for subject detection are individually generated. Alternatively, for example, the signal for AE, the signal for white balance adjustment, and the signal for subject detection may be generated as a common signal. A combination of signals generated as a common signal is not limited to this combination.

The camera MPU 125 (control device) performs all calculations and control related to the camera main body 120. More specifically, the camera MPU 125 controls the image sensor drive circuit 123, the image processing circuit 124, the display device 126, the operation switch unit 127, the memory 128, the phase difference AF unit 129, the AE unit 130, the white balance adjustment unit 131, and the subject detection unit 132. The camera MPU 125 is connected to the lens MPU 117 via a signal line of the mount M, and communicates commands and data with the lens MPU 117. The camera MPU 125 issues an acquisition request for acquiring a lens position and a lens drive request for driving a lens with a predetermined drive amount to the lens MPU 117, and also issues an acquisition request for acquiring optical information unique to the lens unit 100, to the lens MPU 117.

The camera MPU 125 includes a read-only memory (ROM) 125a storing programs for controlling the operation of the camera main body 120, a random access memory (RAM) 125b, i.e., camera memory, storing variables, and an electrically erasable programmable read-only memory (EEPROM) 125c storing various parameters. The camera MPU 125 executes focus detection processing based on a program stored in the ROM 125a. In the focus detection processing, known correlation calculation processing is executed using a pair of image signals obtained by photoelectrically converting optical images formed from light beams having passed through mutually different pupil regions (pupil partial regions) of the imaging optical system.

The display device 126 includes a liquid crystal display (LCD), and displays information regarding an imaging mode of the camera system 10, a preview image before image capturing, an image for checking after image capturing, and an in-focus state display image in focus detection. The operation switch unit 127 includes a power switch, a release (imaging trigger) switch, a zoom operation switch, and an imaging mode selection switch. The memory 128 (recording unit) is a detachable flash memory, and records captured images.

The phase difference AF unit 129 performs focus detection processing of a phase difference detection method based on image signals (signals for phase difference AF) of image data for focus detection that are obtained from the image sensor 122 and the image processing circuit 124. More specifically, the image processing circuit 124 generates a pair of image data formed from light beams having passed through a pair of pupil regions of the imaging optical system, as data for focus detection, and the phase difference AF unit 129 detects a focus shift amount based on a shift amount between the pair of image data. In this manner, the phase difference AF unit 129 performs phase difference AF (imaging plane phase difference AF) based on an output of the image sensor 122, without using a dedicated AF sensor. The phase difference AF unit 129 includes an acquisition unit 129a and a calculation unit 129b. Operations of these units will be described below. At least part of the phase difference AF unit 129 (part of the acquisition unit 129a or the calculation unit 129b) may be provided in the camera MPU 125. The details of the operation of the phase difference AF unit 129 will be described below. The camera MPU 125 and the phase difference AF unit 129 function as a control unit that controls the position of the focus lens 104 using a focus detection result.

The AE unit 130 performs exposure adjustment processing to set appropriate imaging conditions by performing photometry based on signals for AE that are obtained from the image sensor 122 and the image processing circuit 124. Specifically, the AE unit 130 performs photometry based on signals for AE, and calculates an exposure amount at an aperture value, a shutter speed, and at an International Organization for Standardization (ISO) sensitivity that are currently set. The AE unit 130 calculates appropriate aperture value, shutter speed and an ISO sensitivity to be set for image capturing from a difference between the calculated exposure amount and a predefined correct exposure amount, and sets these values as imaging conditions, thereby performing the exposure adjustment processing. The AE unit 130 functions as an exposure adjustment unit that calculates an exposure condition for image capturing using a photometry result, and controls the aperture value of the diaphragm 102, the shutter speed, and the ISO sensitivity.

The white balance adjustment unit 131 performs white balance adjustment processing based on signals for white balance adjustment that are obtained from the image sensor 122 and the image processing circuit 124. Specifically, the white balance adjustment unit 131 performs white balance adjustment processing by calculating white balance in the signals for white balance adjustment, and adjusting weight of color based on a difference from predefined appropriate white balance.

The subject detection unit 132 performs subject detection processing based on a signal for subject detection that is generated by the image processing circuit 124. By performing the subject detection processing, a type and a state of a subject (detection type), and a position and a size of the subject (detection region) are detected. The details of operations of the subject detection unit 132 will be described below.

In this manner, the camera system 10 can execute the phase difference AF, the photometry (exposure adjustment), the white balance adjustment, and the subject detection in combination. Thus, the camera system 10 can select a position (image height range) at which the phase difference AF, the photometry, and the white balance adjustment are to be performed in accordance with a result of subject detection.

Image Sensor

Figure 2:
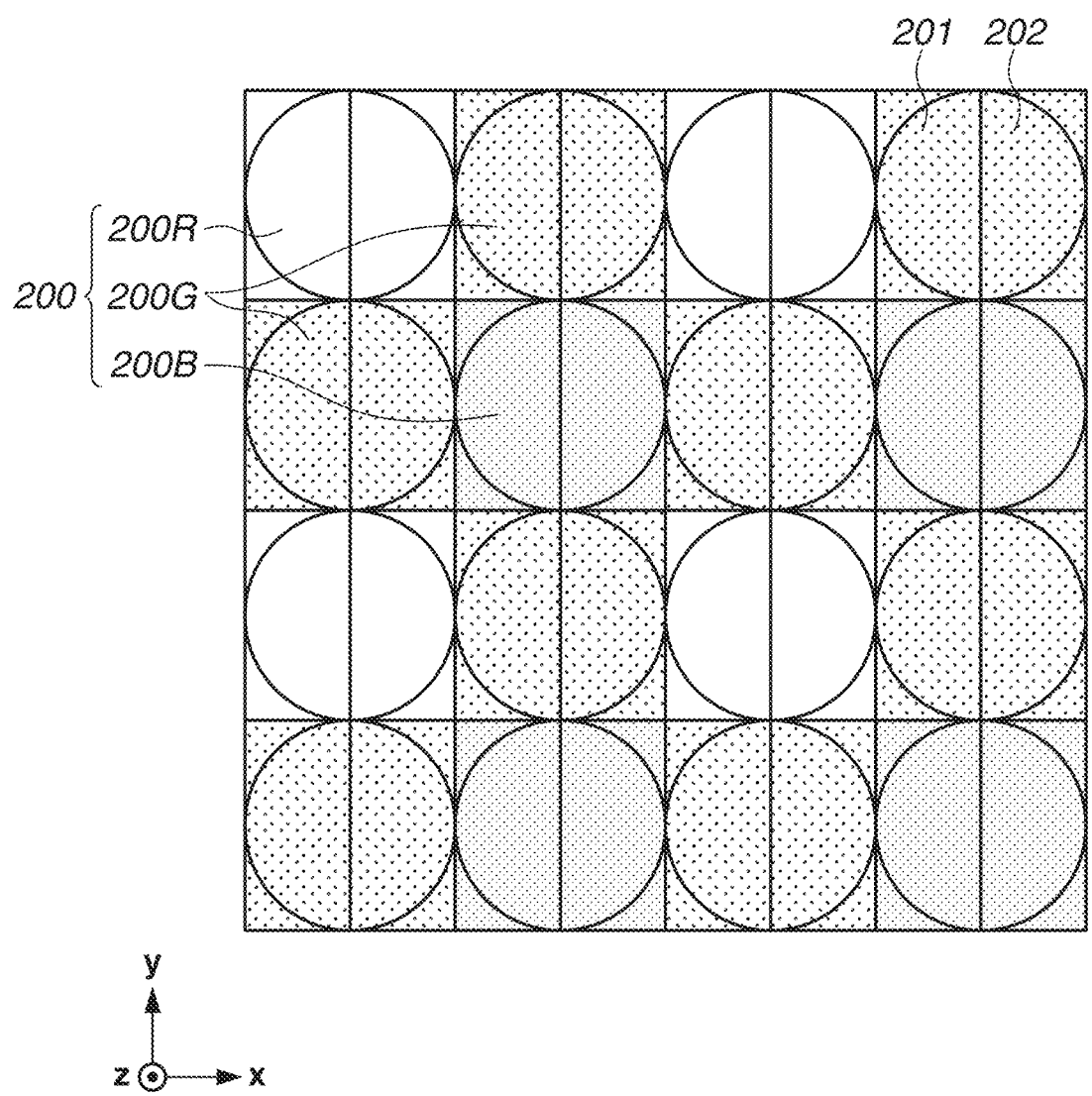
FIG. 2 is a schematic diagram of a pixel array.

FIG. 2 shows the outline of the imaging pixels (and the array of focus detection pixels) of the image sensor according to the embodiment. FIG. 2 illustrates the pixel (imaging pixel) array within the range of 4 columns×4 rows and the focus detection pixel array within the range of 8 columns×4 rows in the two-dimensional CMOS sensor (image sensor) according to this embodiment.

A pixel group 200 includes pixels of 2 columns×2 rows. A pixel 200R having an R (red) spectral sensitivity is arranged at the upper left position, pixels 200G having a G (green) spectral sensitivity are arranged at the upper right and lower left positions, and a pixel 200B having a B (blue) spectral sensitivity is arranged at the lower right position. Each pixel is formed from a first focus detection pixel 201 and a second focus detection pixel 202 arrayed in 2 columns×1 row.

A number of arrays of 4 (columns)×4 (rows) pixels (8 (columns)×4 (rows) focus detection pixels) shown in FIG. 2 are arranged on a plane to enable to capture an image (focus detection signal). In the embodiment, the image sensor will be described assuming that a period P of pixels is 4 .mu·m, the number N of pixels is 5,575 columns in horizontal direction×3,725 rows in vertical direction=about 20,750,000, a column-direction period PAF of focus detection pixels is 2 .mu·m, and the number NAF of focus detection pixels is 11,150 columns in horizontal direction×3,725 rows in vertical direction=about 41,500,000.

Figure 3A:
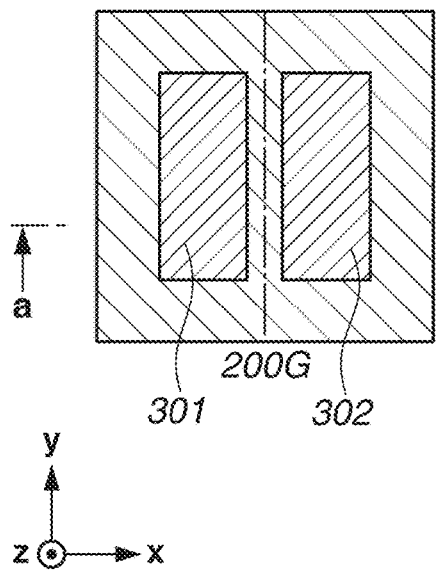
FIGS. 3A and 3B are a schematic plan view and a schematic sectional view, respectively, of a pixel.
Figure 3B:
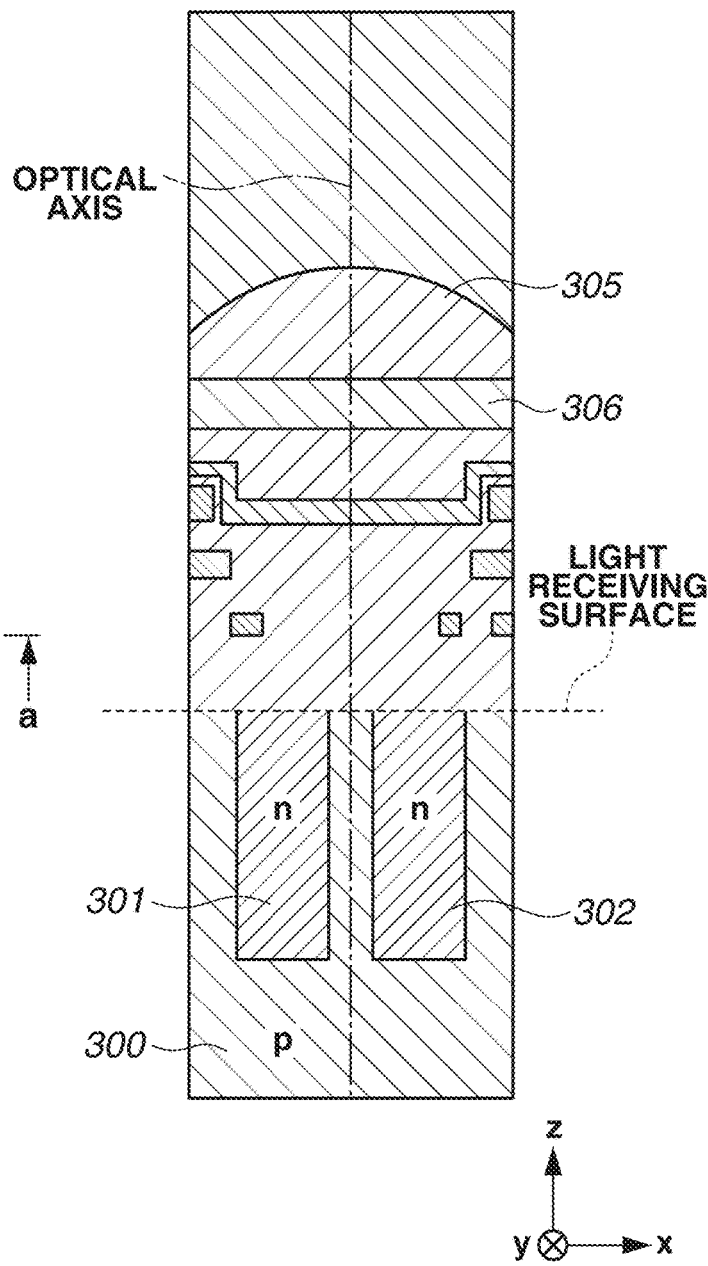

FIG. 3A is a plan view of one pixel 200G of the image sensor show in FIG. 2 when viewed from the light receiving surface side (+z side) of the image sensor 107, and FIG. 3B is a sectional view showing the a-a section in FIG. 3A viewed from the −y side.

As shown in FIGS. 3A and 3B, in the pixel 200G according to this embodiment, a microlens 305 for condensing incident light is formed on the light receiving side of each pixel. The pixel is divided by NH (here, divided by two) in the x direction and divided by HV (here, divided by one, or not divided) in the y direction to form photoelectric conversion units 301 and 302. The photoelectric conversion units 301 and 302 correspond to the first focus detection pixel 201 and the second focus detection pixel 202, respectively.

Each of the photoelectric conversion units 301 and 302 may be formed as a pin structure photodiode including an intrinsic layer between a p-type layer and an n-type layer or a p-n junction photodiode without an intrinsic layer, as needed.

In each pixel, a color filter 306 is formed between the microlens 305 and the photoelectric conversion units 301 and 302. The spectral transmittance of the color filter may be changed between the focus detection pixels, as needed, or the color filter may be omitted.

Light that has entered the pixel 200G shown in FIGS. 3A and 3B is condensed by the microlens 305, spectrally split by the color filter 306, and received by the photoelectric conversion units 301 and 302. In the photoelectric conversion units 301 and 302, electron-hole pairs are produced in accordance with the received light amount and separated in the depletion layer. Electrons having negative charges are accumulated in the n-type layers (not shown). On the other hand, holes are discharged externally from the image sensor through the p-type layers connected to a constant voltage source (not shown). The electrons accumulated in the n-type layers (not shown) of the photoelectric conversion units 301 and 302 are transferred to electrostatic capacitances (FDs) through transfer gates, converted into voltage signals, and output.

Figure 4:
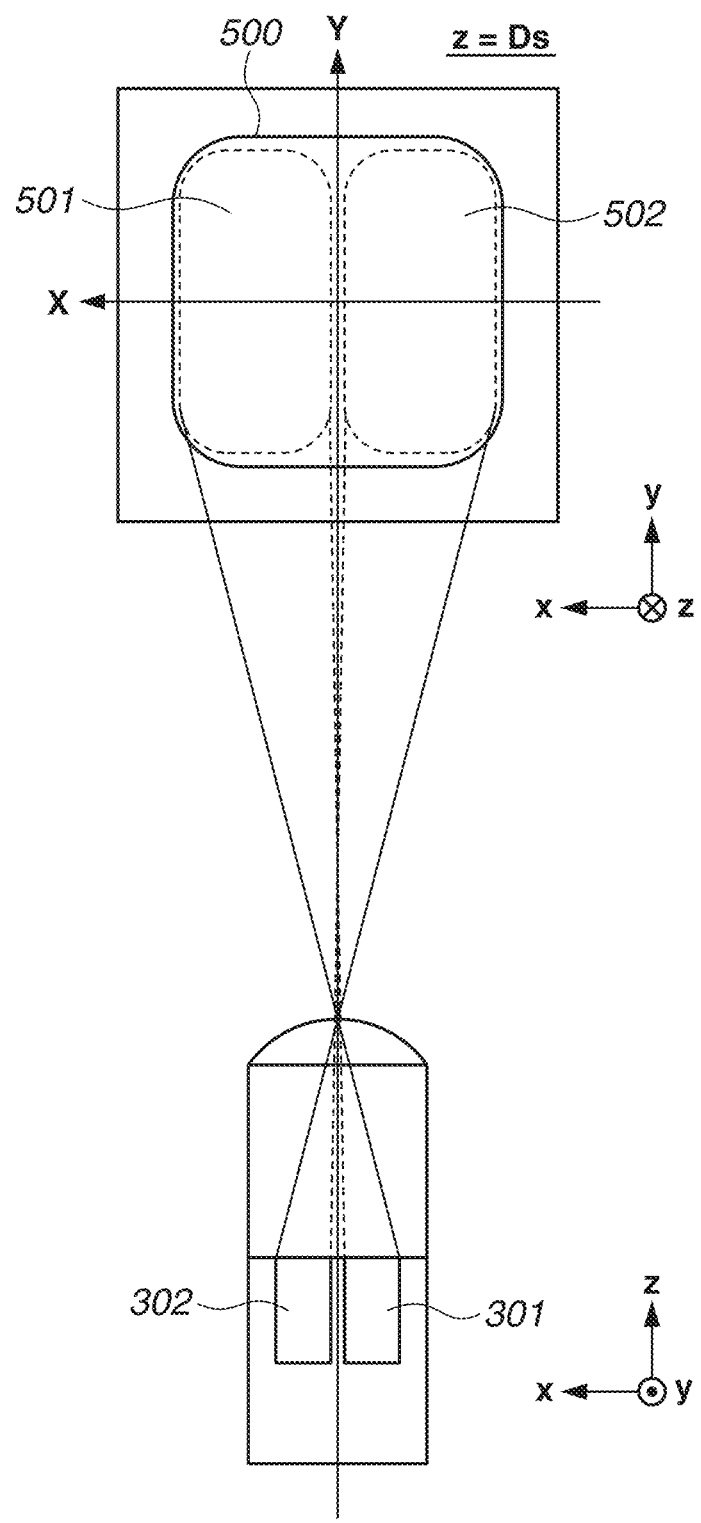
FIG. 4 is a schematic diagram illustrating a pixel and pupil division.

The correspondence between pupil division and the pixel structure according to this embodiment shown in FIGS. 3A and 3B will be described with reference to FIG. 4. FIG. 4 illustrates a sectional view showing the a-a section of the pixel structure according to the embodiment shown in FIG. 3A viewed from the +y side and the exit pupil plane of an imaging optical system. Note that in FIG. 4, to obtain correspondence with the coordinate axes of the exit pupil plane, the x- and y-axes of the sectional view are reversed with respect to those of FIGS. 3A and 3B.

A first partial pupil region 501 of the first focus detection pixel 201 represents a pupil region that is almost conjugate with the light receiving surface of the photoelectric conversion unit 301 having a center of gravity decentered in the −x direction via the microlens 305, and light beams that have passed through the first partial pupil region 501 are received by the first focus detection pixel 201. The first partial pupil region 501 of the first focus detection pixel 201 has a center of gravity decentered to the +x side on the pupil plane.

A second partial pupil region 502 of the second focus detection pixel 202 represents a pupil region that is almost conjugate with the light receiving surface of the photoelectric conversion unit 302 having a center of gravity decentered in the +x direction via the microlens 305, and light beams that have passed through the second partial pupil region 502 are received by the second focus detection pixel 202. The second partial pupil region 502 of the second focus detection pixel 202 has a center of gravity decentered to the −x side on the pupil plane.

Light beams that have passed through a pupil region 500 are received by the whole pixel 200G including the photoelectric conversion units 301 and 302 (first focus detection pixel 201 and the second focus detection pixel 202).

Figure 5:
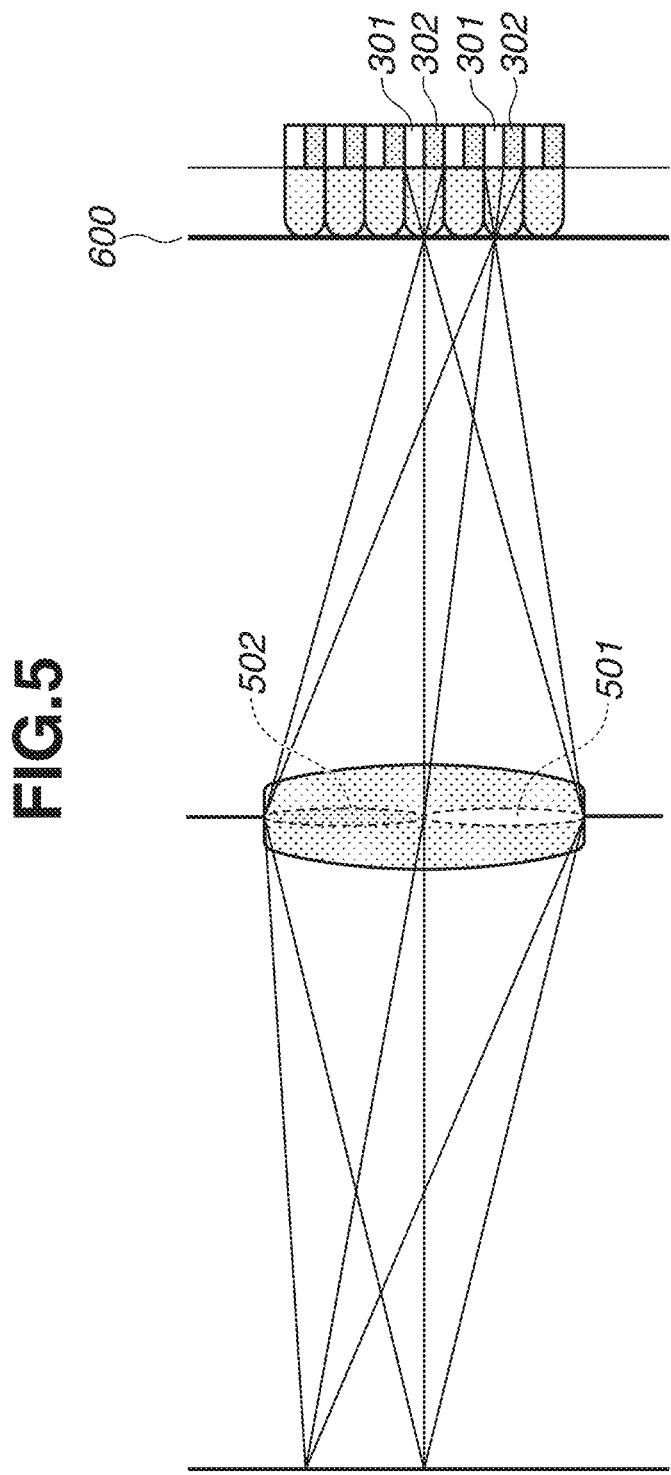
FIG. 5 is a schematic diagram illustrating an image sensor and pupil division.

FIG. 5 is a schematic view showing the correspondence between the image sensor and pupil division according to the embodiment. A pair of light beams that have passed through different exit pupil regions of the imaging optical systems of the first partial pupil region 501 and the second partial pupil region 502 enter the pixels of the image sensor at different incidence angles and are received by the first focus detection pixel 201 and the second focus detection pixel 202 divided into 2×1 parts. In this embodiment, the pupil region is divided into two parts in the horizontal direction. However, the pupil may be divided in the vertical direction, as needed.

Note that in the above-described example, a plurality of imaging pixels each including the first focus detection pixel and the second focus detection pixel is arrayed. However, the aspect of the embodiments is not limited to this. Imaging pixels, first focus detection pixels, and second focus detection pixels may individually be constituted, and the first focus detection pixels and the second focus detection pixels may partially be arranged in part of the imaging pixel array, as needed.

In this embodiment, the light receiving signals of the first focus detection pixels 201 of the respective pixels of the image sensor are collected to generate a first focus detection signal, and the light receiving signals of the second focus detection pixels 202 of the respective pixels are collected to generate a second focus detection signal, thereby performing focus detection. In addition, the signals of the first focus detection pixel 201 and the second focus detection pixel 202 are added for each pixel of the image sensor, thereby generating an image signal (captured image) having a resolution corresponding to the effective number N of pixels.

Relationship between Defocus Amount and Image Shift Amount

Hereinafter, a relationship between defocus amounts of the first focus detection signal and the second focus detection signal acquired by the image sensor and an image shift amount between the first focus detection signal and the second focus detection signal according to the first exemplary embodiment will be described.

Figure 6:
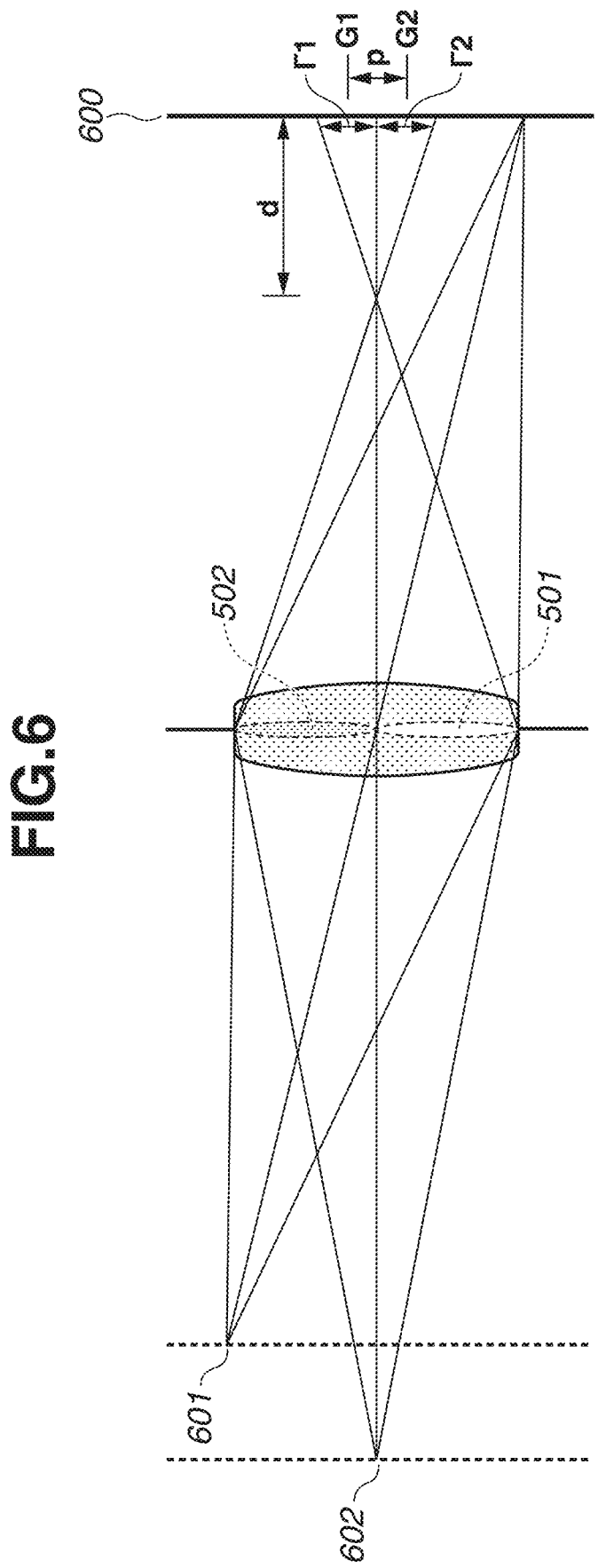
FIG. 6 is a schematic diagram illustrating a relationship of a defocus amount and an image shift amount.

FIG. 6 is a schematic diagram illustrating a relationship between defocus amounts of the first focus detection signal and the second focus detection signal and an image shift amount between the first focus detection signal and the second focus detection signal. The image sensor (not illustrated) according to the first exemplary embodiment is arranged on an imaging plane 600, and as similarly illustrated in FIGS. 4 and 5, the exit pupil plane is divided into two regions corresponding to the first pupil partial region 501 and the second pupil partial region 502. A defocus amount d is defined by the magnitude |d| of a distance from an image forming position of a subject to an imaging plane, and a front focus state in which an image forming position of a subject exists closer to the subject than the imaging plane is represented by a minus sign (d<0). A back focus state in which an image forming position of a subject exists on the opposite side of the subject across the imaging plane is represented by a plus sign (d>0). In an in-focus state in which an image forming position of a subject exists on the imaging plane (in-focus position), d=0 is obtained. FIG. 6 illustrates a subject 601 as an example of the in-focus state (d=0), and a subject 602 as an example of the front focus state (d<0).

The front focus state (d<0) and the back focus state (d>0) are collectively referred to as a defocus state (|d|>0).

In the front focus state (d<0), among light beams from the subject 602, light beams having passed through the first pupil partial region 501 (the second pupil partial region 502) are once condensed, and then spread to have a width Γ1 (Γ2) centered on the position G1 (G2) of a center of gravity of light beams, and a defocused image is formed on the imaging plane 600. The defocused image is received by the first focus detection pixel 201 (second focus detection pixel 202) included in each of the pixels arrayed on the image sensor, and a first focus detection signal (second focus detection signal) is generated. Thus, the first focus detection signal (second focus detection signal) is recorded at the position G1 (G2) of the center of gravity on the imaging plane 600 as a subject image of the subject 602 having the blur width Γ1 (Γ2). The blur width Γ1 (Γ2) of the subject image increases substantially proportionally to an increase in the magnitude |d| of the defocus amount d. Similarly, a magnitude |p| of an image shift amount p of the subject image between the first focus detection signal and the second focus detection signal (=difference between the center of gravity positions G1 and G2 of light beams) also increases substantially proportionally to an increase in the magnitude |d| of the defocus amount d. The same applies to the back focus state (d>0) except that a direction in which the subject image shifts between the first focus detection signal and the second focus detection signal is opposite to that in the front focus state.

The magnitude of the image shift amount between the first focus detection signal and the second focus detection signal increases in accordance with increases in the magnitudes of the defocus amounts of the first focus detection signal and the second focus detection signal or an increase in the magnitude of the defocus amount of an imaging signal obtained by adding the first focus detection signal and the second focus detection signal. In the first exemplary embodiment, the phase difference AF unit 129 accordingly converts the image shift amount into a detection defocus amount using a conversion coefficient calculated based on a base length, in view of the relationship in which the magnitude of the image shift amount between the first focus detection signal and the second focus detection signal increases in accordance with an increase in the magnitude of the defocus amount of the imaging signal.

Flowchart of Overall Processing

Hereinafter, an overall control method in image capturing according to the present exemplary embodiment will be described with reference to FIGS. 7 and 8A to 8C.

Figure 8A:
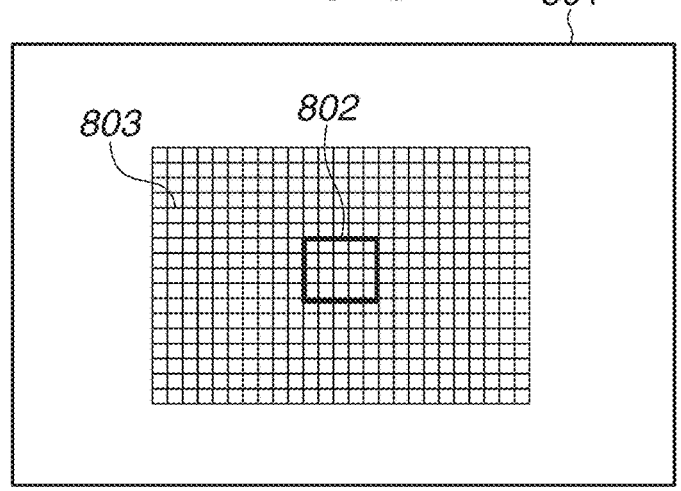
FIGS. 8A to 8C are schematic diagrams illustrating defocus region setting.

In step S701, a defocus amount calculation region to be used for calculation executed by the phase difference AF unit 129 is set. At this time, as illustrated in FIG. 8A, a calculation region 803 is set around an arbitrary AF frame 802 (arbitrary region) selected by the user on an image capturing screen 801 so that multipoint defocus calculation can be performed in a range wider than the AF frame 802.

In step S702, a defocus amount is calculated at each point in the defocus amount calculation region 803 set in step S701.

Figure 8B:
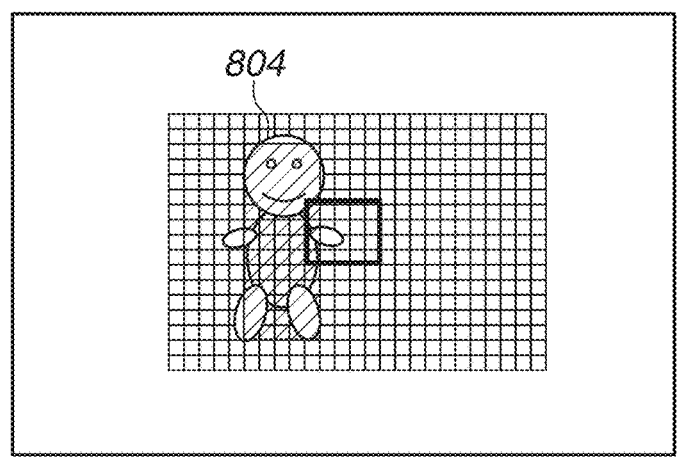

In step S703, the defocus amounts calculated in step S702 are separated into classes. In the class separation, by creating histograms based on the defocus amounts and identifying a class to which the subject belongs by interframe matching, a region in which defocus amounts fall within a predetermined range, like a subject class region 804 in FIG. 8B, is acquired. In step S704, specific subject recognition detection is performed. As the detection method, a learning technique that uses known machine learning, or recognition processing executed by an image processing unit is used. In the learning technique that uses machine learning, a feature amount of each portion (face, pupil, entire body) of a subject (human, animal, etc.) is preliminarily learned, a preliminarily-learned subject is recognized from a captured image, and the region (or position and size) is acquired.

For example, types of machine learning include the following types:
(1) Support Vector Machine
(2) Convolutional Neural Network
(3) Recurrent Neural Network.

As an example of recognition processing, there has been known a method of extracting a skin color region from gradation color of pixels represented by image data and detecting a face based on a degree of matching with a face outline plate prepared in advance. In addition, there is known a method of detecting a face by extracting a feature point of a face such as an eye, a nose, or a mouth using a known pattern recognition technique. Furthermore, a detection method of detecting a main region that can be applied to the present exemplary embodiment is not limited to these methods, and another method may be used.

In step S705, it is determined whether a subject has been recognized in the subject recognition detection in step S704. In a case where a subject has been recognized (YES in step S705), the processing proceeds to step S706. In a case where a subject has not been recognized (NO in step S705), the processing proceeds to step S707.

In step S706, it is checked whether the subject detection class calculated in step S703 exists. In a case where the subject detection class exists (YES in step S706), the processing proceeds to step S708. In a case where the subject detection class does not exist (NO in step S706), the processing proceeds to step S709.

In step S708, main subject region selection is performed using the subject detection class calculated in step S703, and an AF position on an image capturing screen is determined. The details of the main subject region selection processing will be described below.

In step S709, main subject region selection is performed using the subject recognition position detected in step S704, and an AF position on an image capturing screen is determined. The details of the main subject region selection processing will be described below.

Figure 8C:
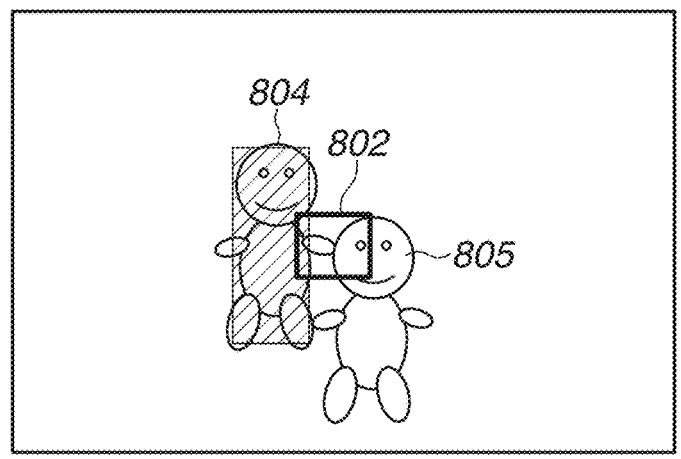

In step S707, it is checked whether the subject detection class calculated in step S703 exists. In a case where the subject detection class exists (YES in step S707), the processing proceeds to step S710. In a case where the subject detection class does not exist (NO in step S707), the processing proceeds to step S711. The reason why higher priority is put on the subject detection class than the subject recognition position is as follows. For example, in image capturing of a basketball match, there may be a scene in which a plurality of subjects exists as illustrated in FIG. 8C, and when a subject 804 is in focus, a subject 805 moves inside the AF frame. In such a scene, the subject 804 is to be continuously in focus when focus adjustment is continuously performed, even if the subject 805 exists within the AF frame. Thus, in a case where a subject detection class has been detected for the subject 804, the subject detection class including the subject 804 is used for main subject region selection.

In step S710, main subject region selection is performed using the subject detection class calculated in step S703, and an AF position on an image capturing screen is determined. The details of the main subject region selection processing will be described below.

In step S711, a center position of an AF frame arbitrarily designated by the user is set as a main subject region.

In step S712, it is determined whether to drive the focus lens 104 to the position of the main subject region selected in any of steps S708 to S711. From the history of image plane positions in the optical axis direction of the subject that are obtained from defocus amount calculation results for regions selected in the main subject region selection executed so far, an image plane position at the timing for defocus amount calculation this time is estimated by a least-square method. Then, if a difference between the estimated image plane position and the subject position selected as the main subject region falls outside a predetermined range, it is determined that the user has failed to frame the subject, or an obstacle has entered the frame, and the drive of the focus lens 104 is stopped. If the difference falls within the range of predetermined threshold values, the focus lens 104 is driven using a result of a defocus amount of the main subject region. In a case where the position of the main subject region falls outside the range of the AF frame, the user has failed to frame the subject, so that the driving of the focus lens 104 is stopped until the main subject is framed.

In step S713, in a case where it is determined in the focus drive determination in step S712 that focus drive is to be performed (YES in step S713), the processing proceeds to step S714. In a case where it is determined that focus drive is not to be performed (NO in step S713), the processing proceeds to step S715.

In step S714, a lens drive amount is calculated based on the defocus amount at the position of the main subject region selected in any of steps S708 to S711, and the focus actuator 113 moves the focus lens 104 to perform focus adjustment.

Subject Class

Figure 16:
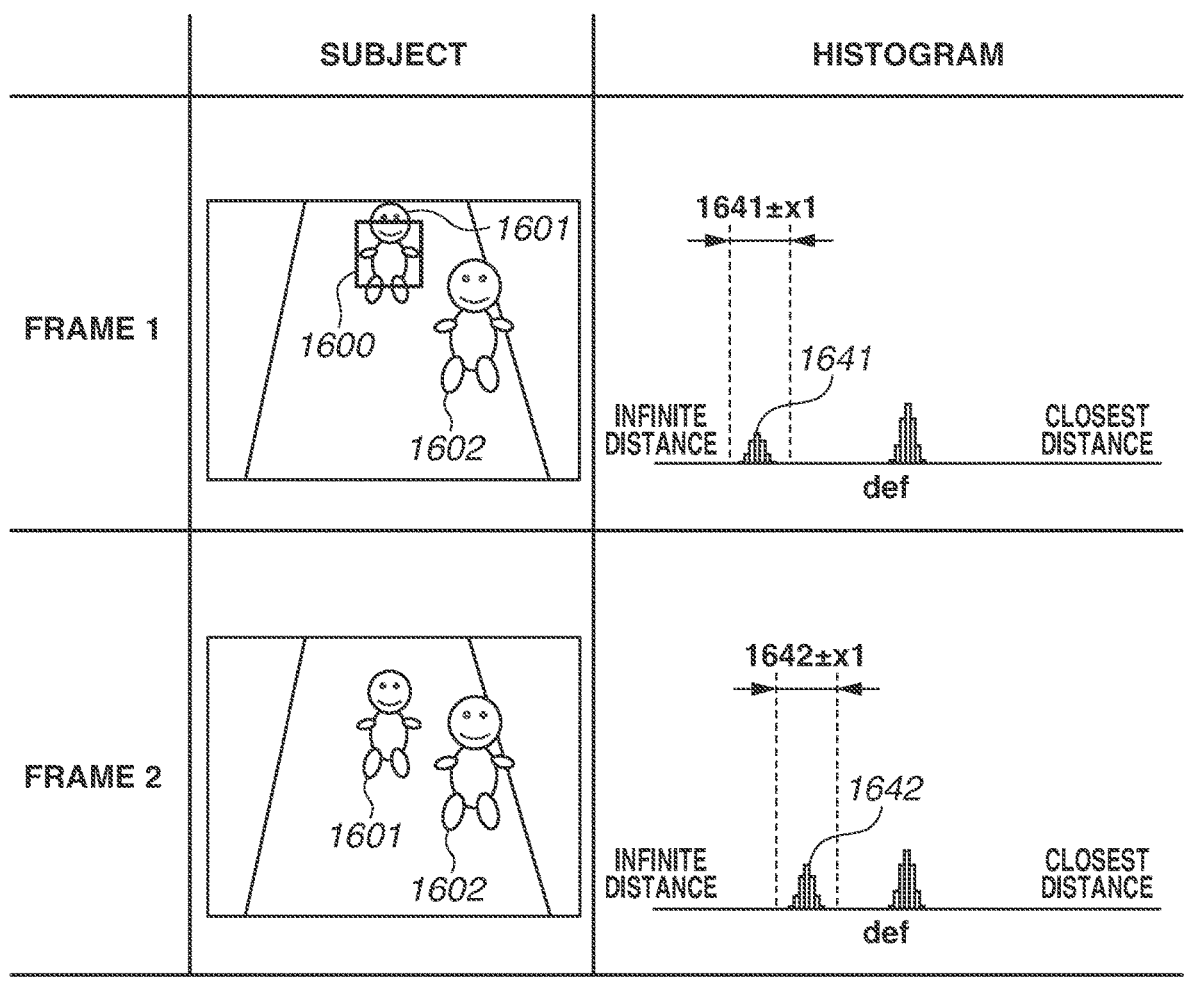
FIG. 16 is a diagram illustrating class separation.

The above-described class separation will be described more specifically with reference to FIG. 16. FIG. 16 illustrates states of subjects in frames 1 and 2 and histograms created based on defocus amounts. FIG. 16 illustrates an example of a scene in which a subject 1601 moves toward a closest distance side (front side) whereas a subject 1602 does not move from the frame 1 to the frame 2. Using each of the defocus amounts calculated in step S702, the position of the main subject 1601 identified in the frame 1 can be also identified in the frame 2 and subsequent frames.

First of all, a histogram illustrated in FIG. 16 is calculated in the frame 1. A horizontal axis indicates a defocus amount, the left side corresponds to an infinite distance side, and the right side corresponds to a closest distance side. A vertical axis indicates a frequency of a calculation region belonging to a corresponding class. A bin interval (interval of each class) and a range in histogram calculation are set in accordance with the depth size of a subject on the image plane that is converted from a subject distance, a subject size, and an aperture value. By setting the bin interval and the range in accordance with the depth size of a subject, resolution in representing a subject on a histogram can be appropriately set irrespective of conditions. In the present exemplary embodiment, a bin interval and a range of a histogram are set in accordance with an imaging condition; the calculation may be performed using a predetermined bin interval and range. A class 1641 in FIG. 16 is a subject class identified in the frame 1.

Next, in the frame 2, a histogram of the frame 1 that is the previous frame, and a histogram of the frame 2 that is the current frame are acquired. In each histogram, the left peak 1641 or 1642 corresponds to the subject 1601 and the right peak corresponds to the subject 1602. In the frame 2, because the subject 1601 has moved toward the closest distance side, and the size of the subject 1601 within the field angle is larger than that of the subject 1601 in the frame 1, the left peak 1642 corresponding to the subject 1601 has moved toward the closest distance side (rightward) and becomes larger. A subject class can be identified considering that objects existing on the front and rear sides of a subject do not change greatly between frames.

Main Subject Region Selection that Uses Subject Detection Class

Figure 9:
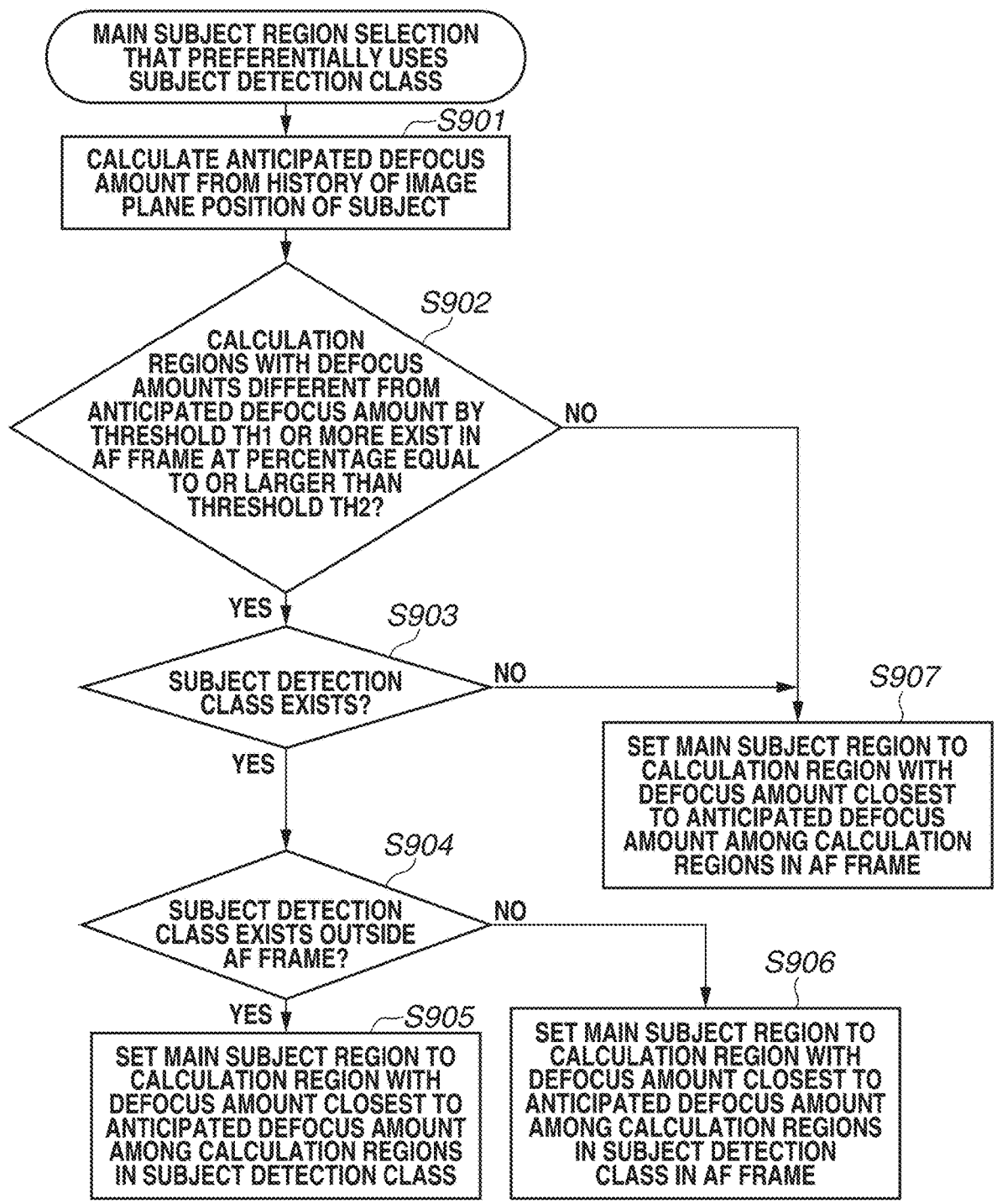
FIG. 9 is a flowchart illustrating main subject region selection that uses a subject detection class.

Hereinafter, a main subject region selection method that uses a subject detection class according to the present exemplary embodiment will be described with reference to FIG. 9.

In step S901, an anticipated defocus amount is calculated from the history of image plane positions of the subject. Specifically, past subject positions on an image plane in the optical axis direction of main subject regions are stored as a history, and a subject position on the image plane at a time at which a defocus amount is calculated is anticipated using the least-square method. After that, an anticipated defocus amount that is based on the past history is calculated from the anticipated subject position and the lens position at the time at which the defocus amount is calculated.

In step S902, each of the defocus amounts calculated in calculation regions within the AF frame is compared to the anticipated defocus amount calculated in step S901, and it is determined whether calculation regions with defocus amounts different from the anticipated defocus amount by a threshold value TH1 or more exist in the AF frame at a ratio equal to or larger than a threshold value TH2. In FIG. 8B, 20 (5×4) calculation regions in total exist in the AF frame, and most of the calculation regions fail to correctly capture the subject. In such a scene, the outside region of the AF frame is to be searched for a correct subject position. Thus, it is checked whether calculation regions without continuity based on the history of the past subject positions (with a difference in defocus amount equal to or larger than the threshold value TH1) exist in the AF frame at the predetermined ratio TH2 or more. In a case where such calculation regions exist (YES in step S902), the processing proceeds to step S903. In a case where no such calculation regions exist (NO in step S902), the processing proceeds to step S907.

In step S903, it is determined whether the subject detection class calculated in step S703 exists.

In a case where the subject detection class exists (YES in step S903), the processing proceeds to step S904. In a case where the subject detection class does not exist (NO in step S903), the processing proceeds to step S907.

In step S904, it is determined whether the subject detection class calculated in step S703 exists outside the AF frame range. In a case where the subject detection class exists outside the range (YES in step S904), the processing proceeds to step S905. In a case where the subject detection class exists within the range (NO in step S904), the processing proceeds to step S906.

In step S905, the main subject region is set to a calculation region with a defocus amount closest to the anticipated defocus amount among calculation regions in the subject detection class.

In step S906, the main subject region is set to a calculation region with a defocus amount closest to the anticipated defocus amount among calculation regions in the subject detection class in the AF frame.

In step S907, the main subject region is set to a calculation region with a defocus amount closest to the anticipated defocus amount among calculation regions in the AF frame.

Main Subject Region Selection that Uses Subject Recognition Position

Figure 7:
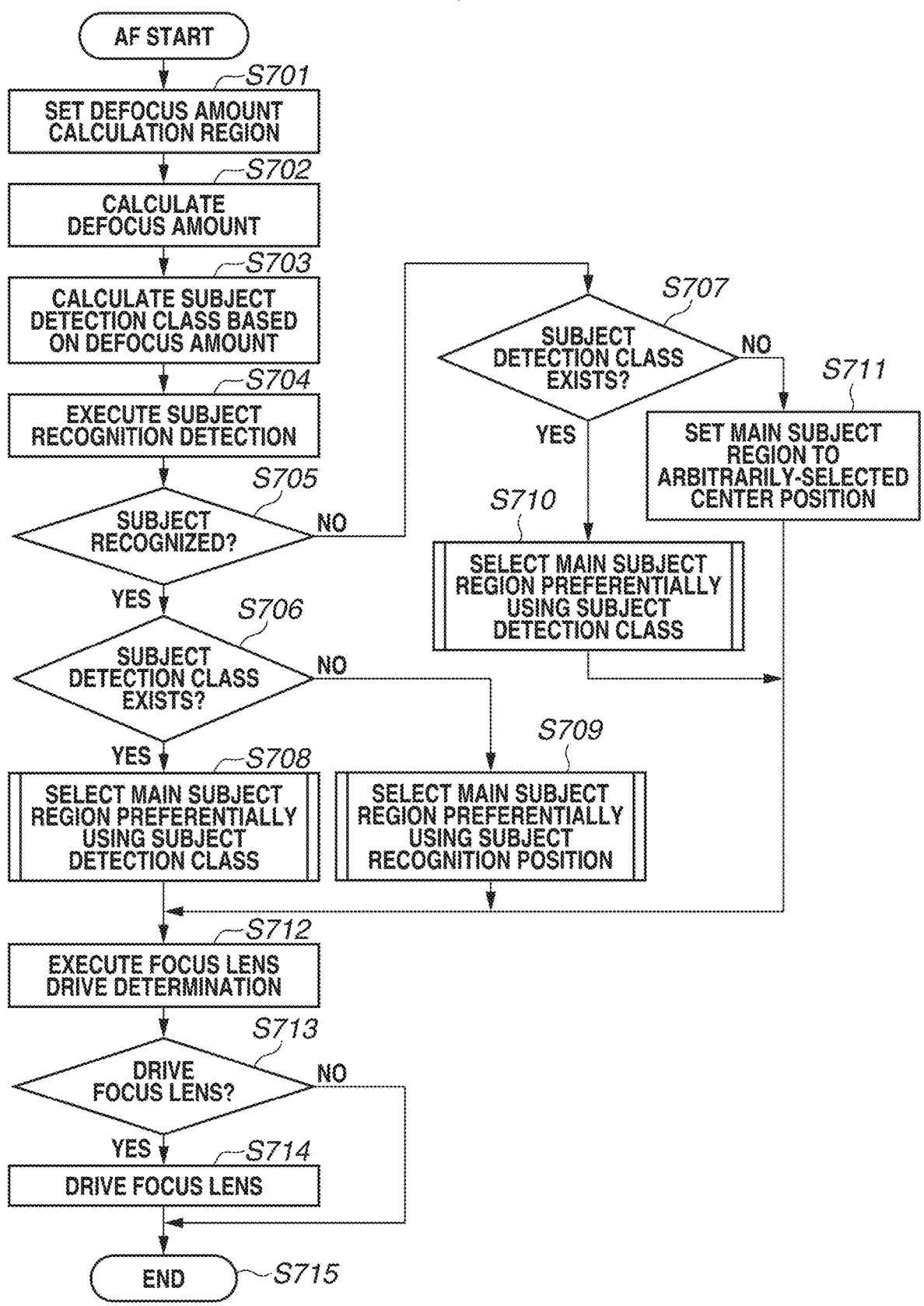
FIG. 7 is a flowchart illustrating overall control.

Main subject region selection processing that uses a subject recognition position in step S709 of FIG. 7 will be described with reference to the flowchart illustrated in FIG. 10. First of all, in step S1001, an overlap region of a region in an AF frame and a subject recognition region is identified. The overlap region will be described with reference to FIGS. 11A and 11B. In FIG. 11A and FIG. 11B, an image capturing region (image capturing screen) 1101 includes an AF frame 1102 represented as a black frame, a subject recognition frame 1103 represented as a double square frame which indicates an index of a subject recognition region, a subject 1104, and a background tree 1105. An overlap region 1106 illustrated in FIG. 11B is represented as a shaded portion. The subject recognition frame 1103 is a subject recognition frame set when a pupil of the subject 1104 is detected. In FIG. 11B, because the subject recognition frame 1103 and the AF frame 1102 overlap, the overlap region 1106 exists.

Next, in step S1002, it is determined whether a size of the overlap region is equal to or larger than a lower limit overlap size. The lower limit overlap size is a reference size for determining whether an AF frame and a subject recognition frame overlap. When the size of the overlap region is equal to or larger than the lower limit overlap size (YES in step S1002), it is determined that the AF frame and the subject recognition frame overlap, and the processing proceeds to step S1004. When it is determined in step S1002 that the overlap region is smaller than the lower limit overlap size (NO in step S1002), it is determined that the AF frame and the subject recognition frame do not overlap, the processing proceeds to step S1003. The determination in step S1002 will be referred to as overlap determination. In FIG. 11A, the subject recognition frame 1103 and the AF frame 1102 do not overlap, and no overlap region exists. Thus, it is determined that an overlap does not exist.

Figure 11A:
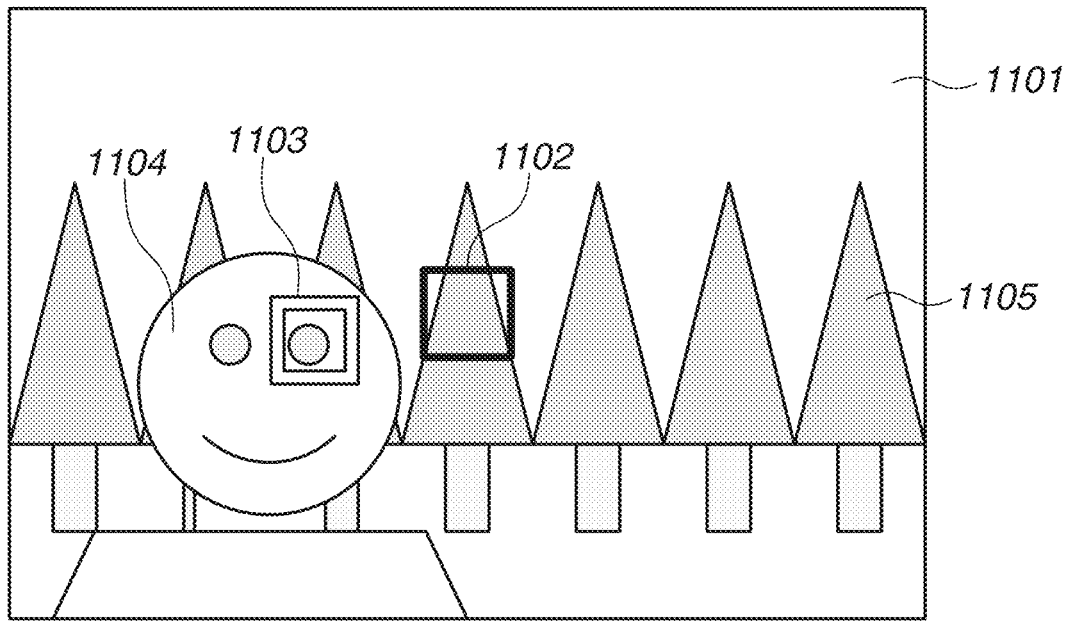
FIGS. 11A and 11B are diagrams illustrating an overlapping scene of a subject recognition region and a region in an autofocus (AF) frame.
Figure 11B:
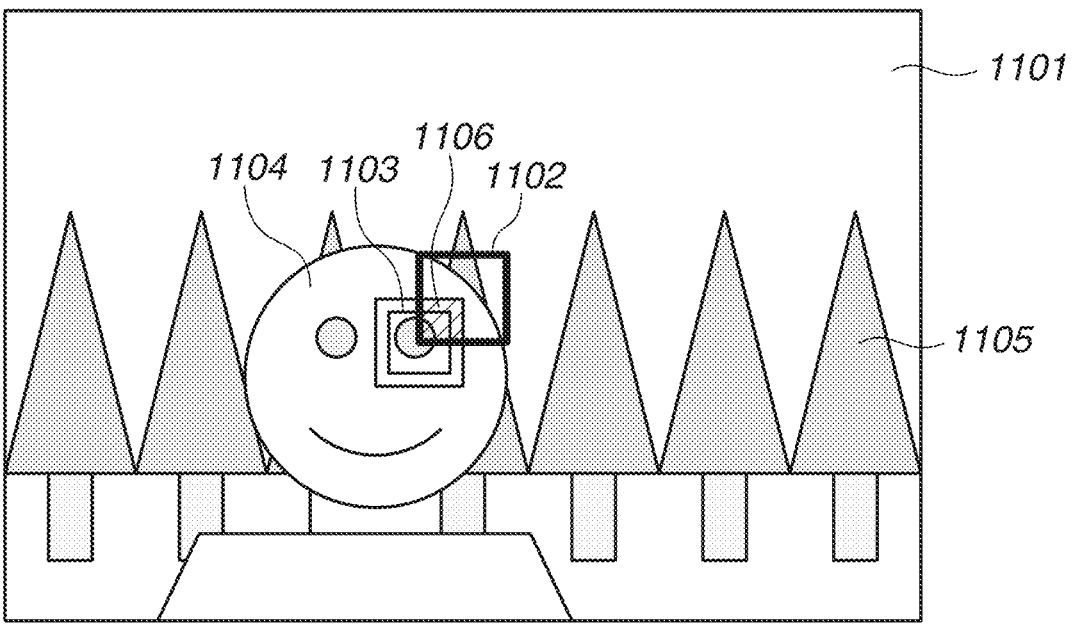
Figure 12A:
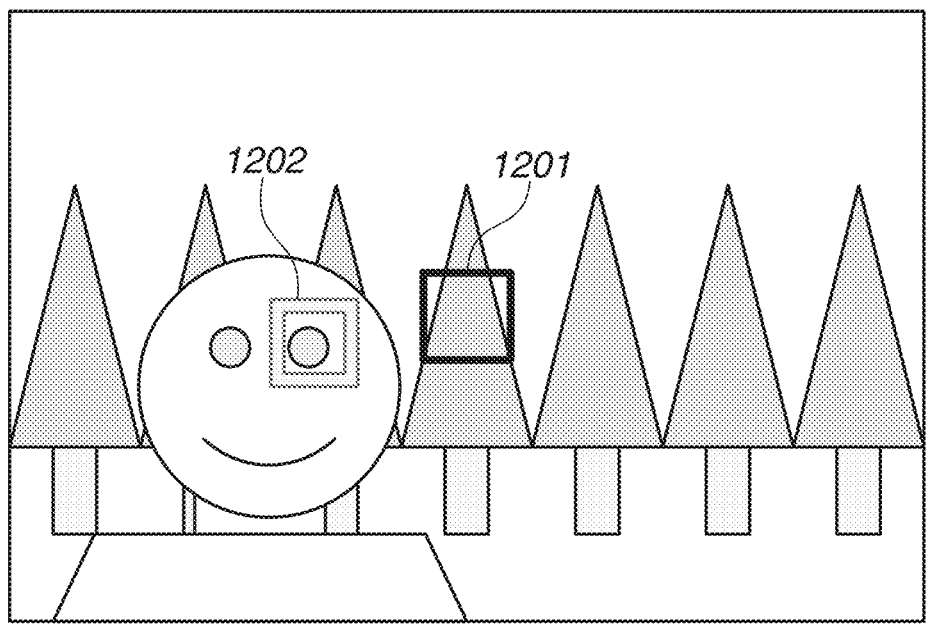
FIGS. 12A and 12B are diagrams illustrating display examples with or without an overlap of a subject recognition region and a region in an AF frame.
Figure 12B:
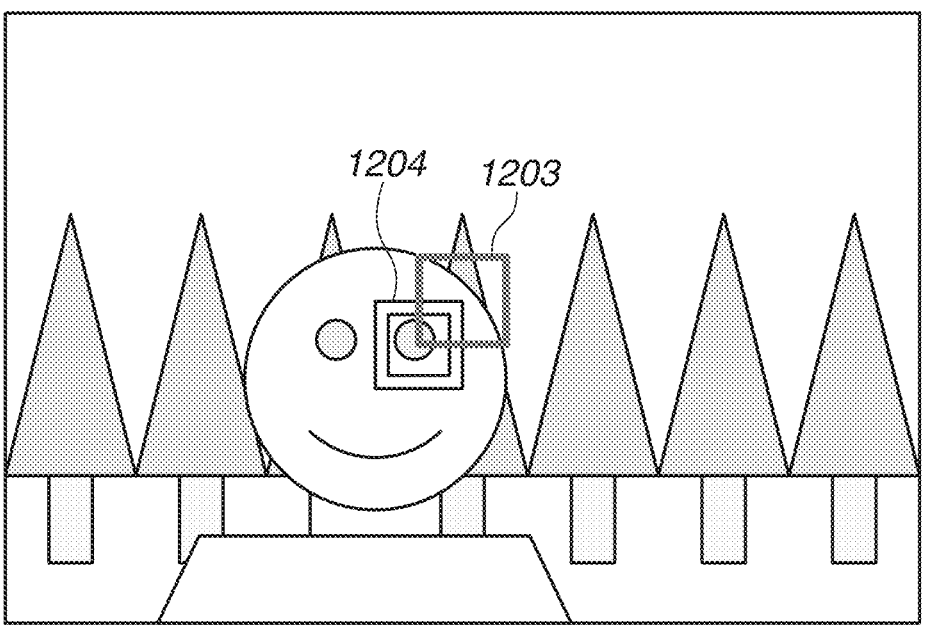

In FIG. 11B, because the overlap region 1106 exists and the size of the overlap region is equal to or larger than the lower limit overlap size, it is determined that the AF frame and the subject recognition frame overlap. In a case where it is determined that the AF frame and the subject recognition frame overlap, then in step S1004, a main subject region is selected from a region in the subject recognition frame. In a case where the AF frame and the subject recognition frame do not overlap, then in step S1003, a main subject region is selected from a region in the AF frame. In step S1005, it is determined whether a difference between a defocus amount of the main subject region selected in step S1004 and the defocus amount of the subject that has been predicted from the history of image plane positions of the subject is equal to or larger than a predetermined amount. In a case where the difference is equal to or larger than the predetermined amount (YES in step S1005), the processing proceeds to step S1003. In step S1003, a main subject region is selected from the region in the AF frame. In step S1008, it is determined whether a setting of displaying the subject recognition frame is enabled. In a case where the subject recognition frame is not to be displayed, in a state in which the AF frame is displayed, the main subject region selection processing that uses a subject recognition position in step S709 of FIG. 7 ends. In a case where the subject recognition frame is to be displayed (YES in step S1008), and in a case where a main subject region is selected from the subject recognition region, the processing proceeds to step S1006. In step S1006, the AF frame is set as a nonactive frame and the subject recognition frame is set as an active frame. In a case where the subject recognition frame is to be displayed (YES in step S1008), and in a case where a main subject region is selected from the region in the AF frame, the processing proceeds to step S1007. In step S1007, the AF frame is set as an active frame and the subject recognition frame is set as a nonactive frame. The active frame is a frame indicating a region to be used for selecting a main subject region that is displayed on the image capturing screen. The active frame is displayed using a solid line like an AF frame 1201 set as an active frame in FIG. 12A, and a subject recognition frame 1204 set as an active frame in FIG. 12B. The nonactive frame, on the other hand, is a frame indicating a region not to be used for selecting a main subject region that is displayed on the image capturing screen. The nonactive frame is displayed using a gray line like an AF frame 1203 set as a nonactive frame in FIG. 12B, and a subject recognition frame 1202 set as a nonactive frame in FIG. 12A. The display formats of the active frame and the nonactive frame are not limited to solid lines and gray lines as in FIGS. 12A and 12B, and may be other display formats. As described above, by selecting either of a region in an AF frame and a subject recognition region from which a main subject region is to be selected, a focus lens can be controlled using a defocus amount of the main subject region obtained from a selected calculation region. In a case where the region in the AF frame is selected, an arbitrary region in an image capturing region can be designated using the AF frame and brought into focus. In a case where the subject recognition region is selected, the subject can be in focus without precisely setting the AF frame on the subject.

Figure 10:
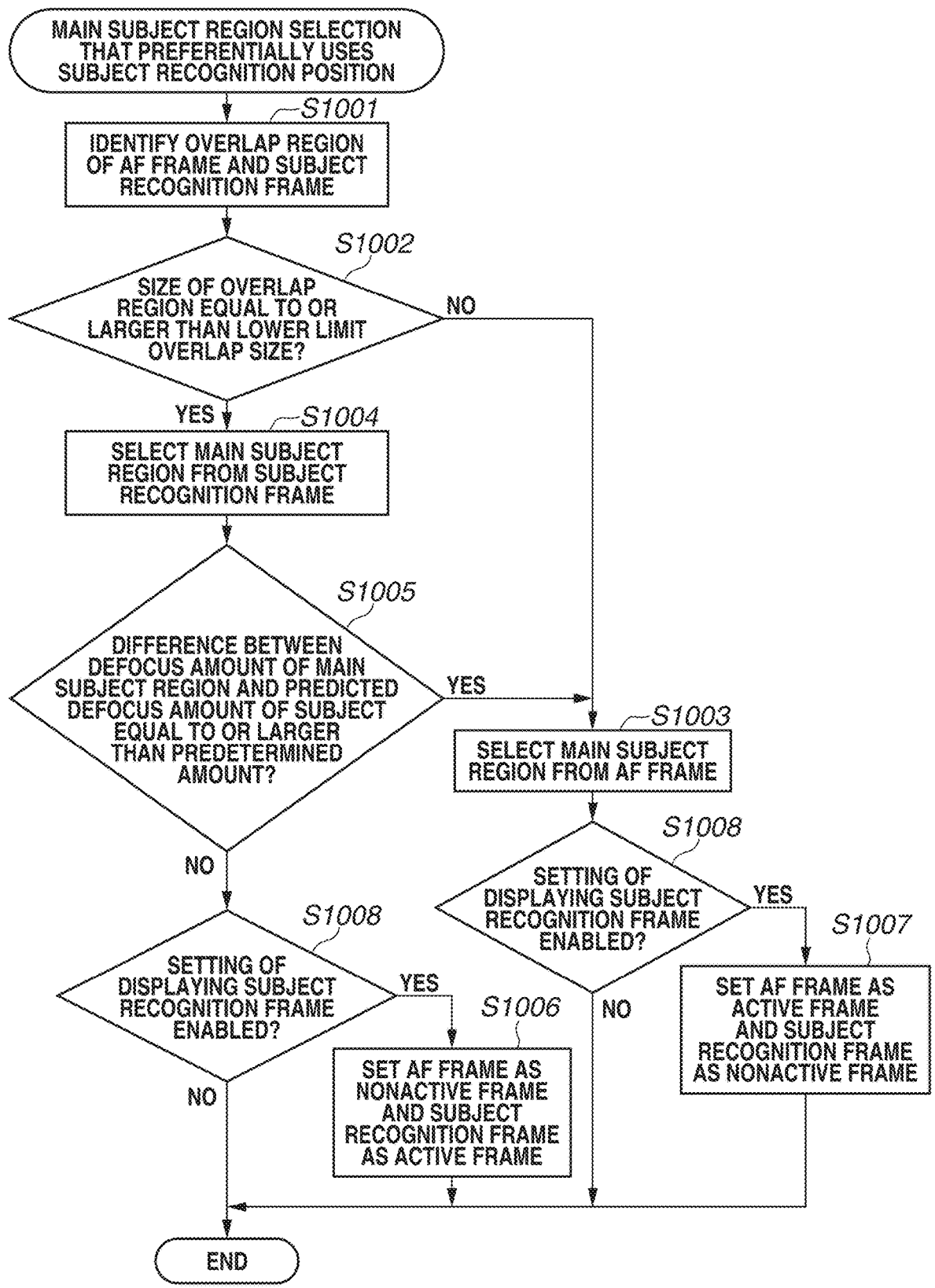
FIG. 10 is a flowchart illustrating main subject region selection that uses a subject recognition position.
Figure 13A:
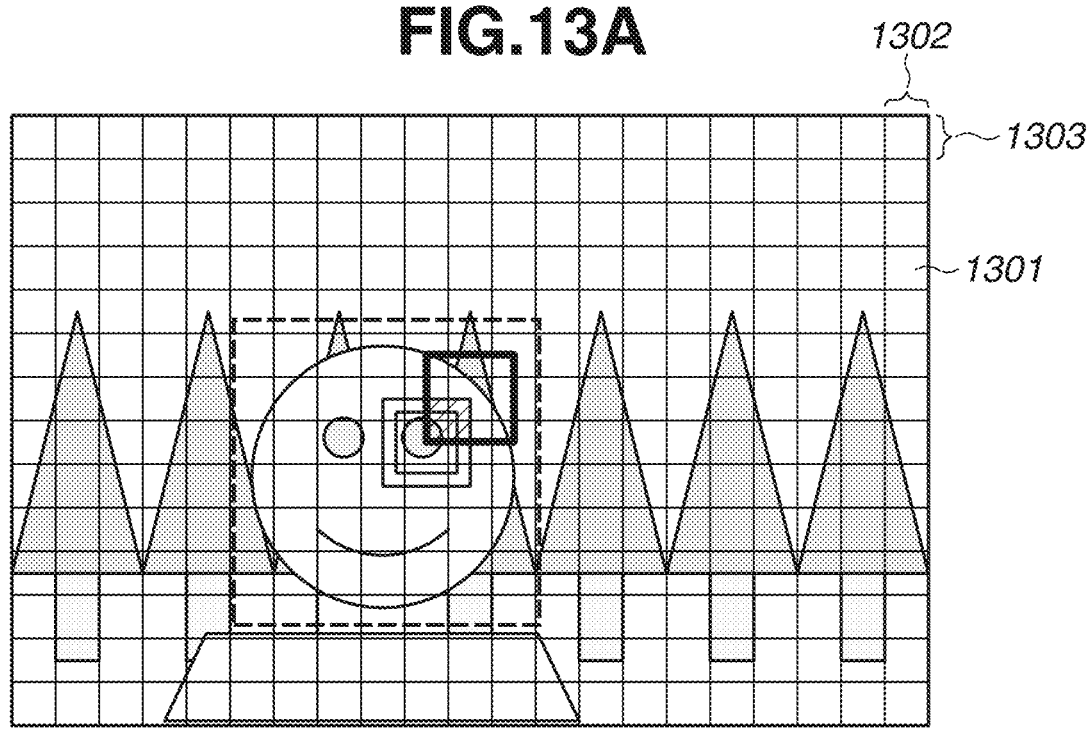
FIGS. 13A and 13B are diagrams illustrating a relationship with a focus measuring frame in overlap determination.
Figure 13B:
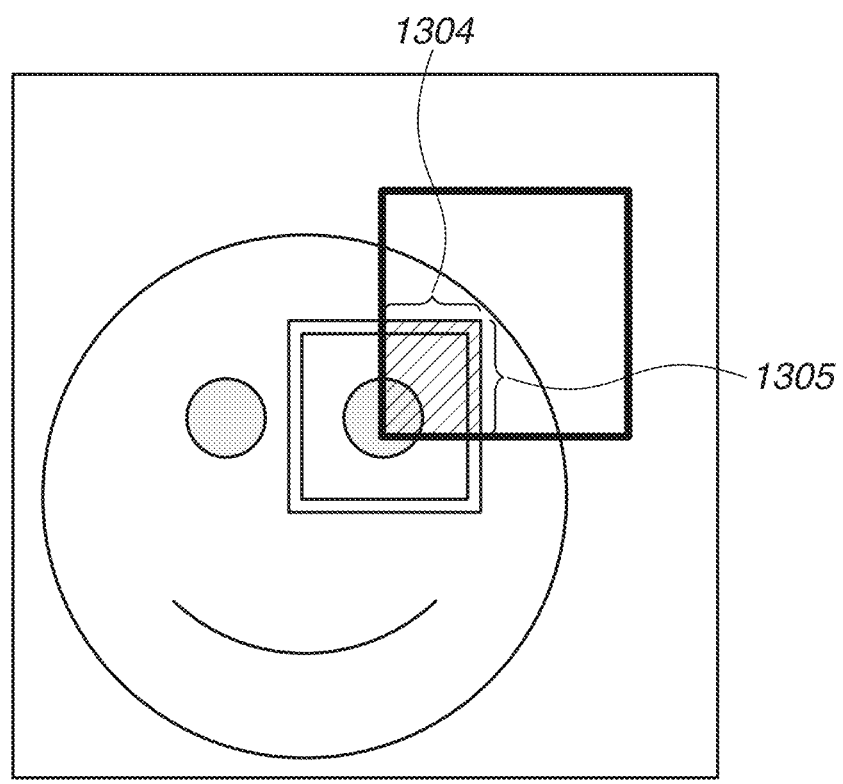

The overlap determination performed in step S1002 of FIG. 10 is important to determine whether a region desired by the user to be in focus exists in the AF frame or in the subject recognition region and select the region. The lower limit overlap size may be defined as follows. FIG. 13A illustrates a screen displaying the defocus amount calculation region set in step S701 of FIG. 7 that is superimposed on the screen illustrated in FIG. 11B. The defocus amount calculation region set in step S701 will be simply referred to as a calculation region. In FIG. 13A, a square 1301 is a region corresponding to one calculation region, a horizontal length 1302 and a vertical length 1303 of a calculation region are each indicated by a curly bracket. FIG. 13B illustrates an enlarged view of a dotted line region surrounding the face illustrated in FIG. 13A. Each curly bracket indicates a horizontal length 1304 of the overlap region of the region in the AF frame and the subject recognition region and a vertical length 1305 of the overlap region. In the overlap determination, the size of the overlap region where the region in the AF frame and the subject recognition region are determined to overlap can be defined by comparing the vertical and horizontal lengths of the overlap region and the vertical and horizontal lengths of the calculation region, and both of the vertical and horizontal lengths of the overlap region can be defined to be longer than those of the calculation region. The description will be given with reference to FIGS. 13A and 13B. In a case where the horizontal length 1304 of the overlap region is longer than the horizontal length 1302 of the calculation region and the vertical length 1305 of the overlap region is longer than the vertical length 1303 of the calculation region, it can be determined that the region in the AF frame and the subject recognition region overlap. In the definition of the overlap determination, it can be guaranteed that the AF frame indicating a region desired by the user to be in focus includes one or more calculation regions for detecting a defocus amount of a subject, and the region desired by the user to be in focus can be estimated to be a region within the subject recognition frame. The processing described above make it possible to determine whether the region desired by the user to be in focus is the region in the AF frame or the subject recognition region and select the region.

In the overlap determination performed in step S1002 of FIG. 10, in a case where the lower limit overlap size is small, the subject recognition region can be used if the region in the AF frame and the subject recognition region overlap slightly. It is thus possible to lower a degree of difficulty of continuously setting the AF frame on the subject. On the other hand, in a case where of the lower limit overlap size is large, the region in the AF frame can be brought into focus even if the region in the AF frame and the subject recognition region overlap slightly. Thus, the user can focus on a targeted region using the AF frame. In other words, depending on the lower limit overlap size, it is possible to keep a balance between lowering a degree of difficulty of continuously setting the AF frame on the subject and making the user to focus on a target region using the AF frame. Thus, the lower limit overlap size may be adjusted considering the balance. For example, in a case where a focal length of the lens unit 100 is longer than a predetermined focal length, the lower limit overlap size may be made smaller than that in a case where the focal length is shorter the predetermined focal length. This is because camera shake occurs more easily and it is more difficult to continuously capture a subject within the AF frame as the focal length is longer. In a case where the moving speed of a subject is faster than a predetermined speed, the lower limit overlap size may be made smaller than that in a case where the moving speed is slower the predetermined speed. This is because it is more difficult to continuously capture a subject within the AF frame as the moving speed of the subject is faster. The moving speed of the subject can be estimated from a speed at which the subject recognition region of the subject continuously recognized during image capturing moves in the image capturing region in vertical and horizontal directions. In a case where the AF frame is smaller than a predetermined size, the lower limit overlap size may be made smaller than that in a case where the size of the AF frame is larger than the predetermined size. This is because, in a case where the AF frame size is small, even small camera shake greatly varies a region included in the AF frame and it is difficult to continuously capture a subject within the AF frame. In a case where the size of a subject is smaller than a predetermined size, the lower limit overlap size may be made smaller than that in a case where the size of the subject is larger than the predetermined size.

This is because a small subject easily falls outside the AF frame even due to slight camera shake, and it is difficult to continuously capture the subject within the AF frame. The size of the subject can be estimated from a size of the subject recognition region of the subject. In a case where a distance between the subject and the imaging apparatus is larger than a predetermined distance, the lower limit overlap size may be made smaller than that in a case where the distance is smaller than the predetermined distance. This is because, in a case where the distance between the subject and the imaging apparatus is large, even small camera shake greatly varies a region included in the AF frame and it is difficult to continuously capture the subject within the AF frame. In a case where a moving image is to be captured, the lower limit overlap size may be made smaller than that in a case where a still image is to be captured. This is because a moving image with the focus position frequently changing is likely to be undesired due to the poor quality, and the focus position can be stabilized by stabilizing the position of the main subject region at the subject. As described above, the overlap determination can be performed in view of the sizes of the calculation region and the overlap region, and a balance between lowering a degree of difficulty of continuously setting the AF frame on the subject, and making the user to focus on a target region using the AF frame. Either the region in the AF frame or the subject recognition region can be thereby selected as a region to be used for selecting a main subject region.

Figure 14:
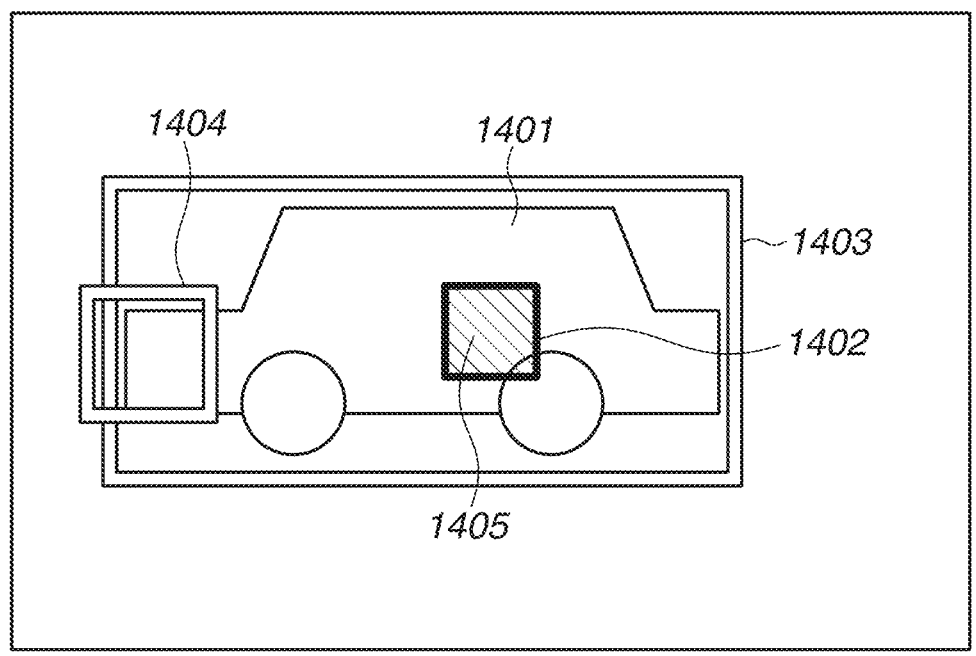
FIG. 14 is a diagram illustrating a display example of a scene in which a portion with a high priority order is determined to overlap.

In some cases, there may be another portion of the same subject that the user desires to focus on more than the calculation region in the subject recognition region determined to overlap in the overlap determination. For example, such a case corresponds to a case where a vehicle is recognized, and even if a subject recognition region indicating the entire vehicle has been determined to overlap in the overlap determination, a head portion of the vehicle has been simultaneously recognized, and the head portion is to be brought into focus. At this time, if the portion to be brought into focus can be brought into focus, the effect of lowering a degree of difficulty of continuously setting the AF frame on the subject can be further enhanced. Thus, a portion determined to overlap in the overlap determination may be changed depending on the priority order of portions detected from the same subject. At this time, a size of an overlap region of a subject recognition region of a portion with a higher priority order and a region in an AF frame may be smaller than the lower limit overlap size. Even in a case where an overlap region of a subject recognition region with an even higher priority order and a region in an AF frame does not exist, the portion determined to overlap may be changed to a subject recognition region with a higher priority order. FIG. 14 illustrates a vehicle 1401 serving as a subject, an AF frame 1402, and a subject recognition frame 1403 that is an index indicating a subject recognition region of the entire vehicle. FIG. 14 also illustrates a subject recognition frame 1404 that is an index indicating a subject recognition region of a head portion, and an overlap region 1405 of a region in the AF frame and the subject recognition region of the entire vehicle. In the example illustrated in FIG. 14, the entire vehicle and the head portion are recognized, and a size of the overlap region 1405 is larger than the lower limit overlap size. At this time, the region of the subject recognition frame 1403 of the entire vehicle overlaps the region in the AF frame. If a higher priority order is placed on the head portion than the entire vehicle, the subject recognition region determined to overlap in the overlap determination can be set to a region corresponding to the subject recognition frame 1404 of the head portion. At this time, even if an overlap region of the region in the AF frame and a region corresponding to the subject recognition frame 1404 of the head portion with a high priority order does not exist as illustrated in FIG. 14, or even if the overlap portion is smaller than the lower limit overlap size, the region of the subject recognition frame 1404 of the head portion can be determined to overlap.

Figure 15:
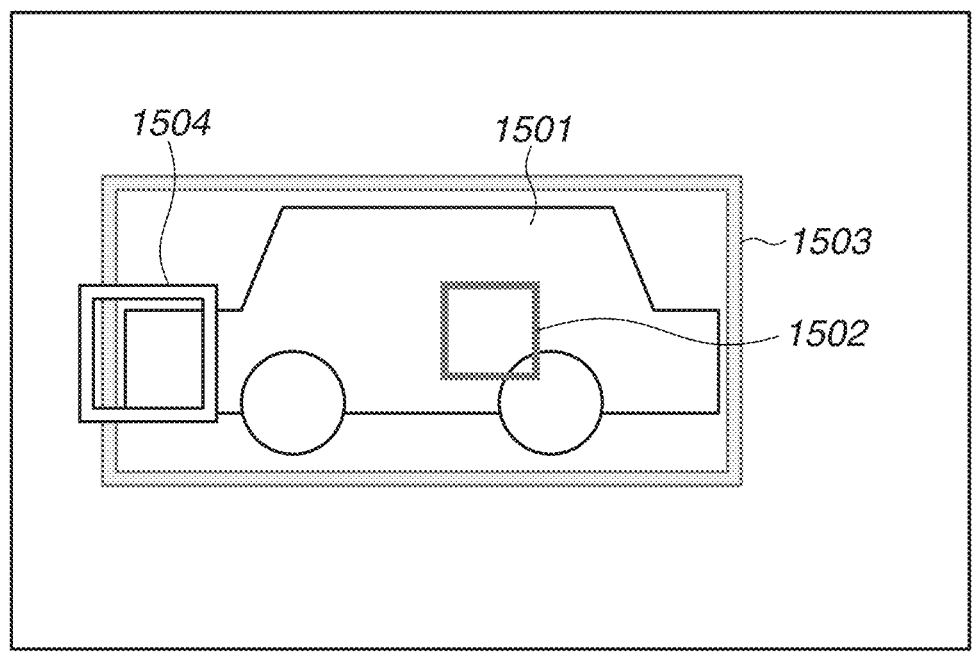
FIG. 15 is a diagram illustrating a display example of a scene in which a portion with a high priority order is determined to overlap.

Regarding display, a subject recognition frame of a portion with a high priority order may be displayed as an active frame, and a subject recognition frame of a portion determined to overlap but having a low priority order and an AF frame may be displayed as nonactive frames. FIG. 15 illustrates an example of display of an AF frame and subject recognition frames in the scene illustrated in FIG. 14. FIG. 15 illustrates a vehicle 1501 serving as a subject, an AF frame 1502 being a nonactive frame, a subject recognition frame 1503 of the entire vehicle being a nonactive frame, and a subject recognition frame 1504 of a head portion being an active frame. FIG. 15 illustrates a display example, and display formats of the active frame and nonactive frames may be other display formats. In a case where a region used for the main subject region selection is a region corresponding to the subject recognition frame 1504, the subject recognition frame 1503 indicating another portion of the same subject may be hidden. Thus, in one embodiment, the portion of the subject that is to be brought into focus can be in focus with a lower degree of difficulty of continuously setting the AF frame on the subject.

The display processing to be performed before and after the user issues an image capturing preparation instruction operation (SW1) in a case where a subject recognition frame is not displayed and in a case where a subject recognition frame is displayed is as described below. First of all, as processing to be performed "in a case where a subject recognition frame is not displayed", the subject recognition frame is hidden irrespective of whether the AF frame and the subject recognition frame overlap, and the AF frame is displayed as a white frame. When a switch SW1 is pressed, focusing is performed using the subject recognition frame if the AF frame and the subject recognition frame overlap, or using the AF frame if no overlap exists. Tracking is similarly performed while the switch SW1 is held at the time of servo AF. On the other hand, as processing to be performed "in a case where a subject recognition frame is displayed", when the AF frame and the subject recognition frame do not overlap, the AF frame is displayed as a white frame and the subject recognition frame is displayed as a gray frame. If the switch SW1 is pressed at this time, the subject recognition frame is hidden and an object in the AF frame is brought into focus. In the case of servo AF, while the switch SW1 is held after the object is brought into focus, the AF frame is hidden, the subject recognition frame is set on the in-focus object, and AF tracks the object. When the AF frame and the subject recognition frame overlap, the AF frame is displayed as a gray frame and the subject recognition frame is displayed as a white frame. If the switch SW1 is pressed at this time, the AF frame is hidden and a subject in the subject recognition frame is brought into focus. In the case of servo AF, while the switch SW1 is held after the subject is brought into focus, AF tracks the subject using the subject recognition frame.

According to the above-described exemplary embodiment, it is possible to accurately achieve focus on a subject without precisely framing a subject in arbitrary selection AF.

Other Exemplary Embodiments

The exemplary embodiment of the disclosure can also be implemented by processing in which programs for implementing one or more functions of the above-described exemplary embodiment are supplied to a system or an apparatus via a network or a storage medium, and one or more processors in a computer of the system or the apparatus read out the programs and execute the programs. The exemplary embodiment of the disclosure can also be implemented by a circuit (for example, an application specific integrated circuit (ASIC)) implementing one or more functions.

According to the present exemplary embodiment, in an imaging apparatus having an automatic focusing function, focus is achieved on a subject that a user desires to focus on without precisely setting an AF frame on the subject.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-076751, filed Apr. 28, 2021, and No. 2021-076752, filed Apr. 28, 2021, which are hereby incorporated by reference herein in their entirety.

What is claimed is:

1. An apparatus comprising:
a device configured to acquire an image signal by photoelectrically converting a light beam of a subject that has entered via an optical system including a focus lens;
a setting unit configured to set a first region in the image signal;
a focus detection unit configured to detect a defocus amount for a plurality of regions in the image signal;
a detection unit configured to detect a second region as a region of a specific subject, based on the image signal; and
a control unit configured to control the focus lens based on the defocus amount included in the second region in a case where the first region and the second region overlap, and configured to control the focus lens based on the defocus amount included in the first region in a case where the first region and the second region do not overlap.

2. The apparatus according to claim 1, wherein a display format of an index indicating a region is varied between a case where the second region is an in-focus region and a case where the second region is not an in-focus region.

3. The apparatus according to claim 1, wherein, in a case where an overlap region in which the first region and the second region overlap is larger than a predetermined size, it is determined that the first region and the second region overlap.

4. The apparatus according to claim 3, wherein the predetermined size is a size corresponding to (i) one of divided regions obtained by dividing a region in the image signal into the plurality of regions, (ii) a focal length of the optical system, or (iii) a moving speed of a specific subject detected by the detection unit.

5. The apparatus according to claim 3, wherein the predetermined size is larger in a case where a still image is recorded than in a case where a moving image is recorded.

6. The apparatus according to claim 3, wherein the predetermined size becomes smaller as (i) the first region becomes smaller, (ii) the second region becomes smaller, or (iii) a distance to a specific subject detected by the detection unit becomes greater.

7. The apparatus according to claim 1, further comprising a predication unit configured to predict a defocus amount at a subject position from a history of an image plane position of a subject.

8. The apparatus according to claim 7, further comprising an acquisition unit configured to acquire a subject region from a detection history of a defocus amount detected by the focus detection unit,
wherein the control unit determines whether to use the defocus amount detected in one of divided regions obtained by dividing a region in the image signal into the plurality of regions in the first region, for movement control of the focus lens, based on information about the subject region obtained from the detection history of the defocus amount and the defocus amount predicated by the predication unit.

9. The apparatus according to claim 8, wherein the control unit does not move the focus lens in a case where a number of divided regions each having a difference between the defocus amount predicted by the predication unit and the defocus amount in the divided region in the first region that is equal to or larger than a first threshold value is a second threshold value or more.

10. The apparatus according to claim 8, wherein the control unit does not move the focus lens based on the defocus amount in the divided region in the first region in a case where the subject region obtained from the detection history of the defocus amount exists outside the first region.

11. The apparatus according to claim 1, wherein the control unit controls the focus lens based on the defocus amount included in the second region that does not overlap with part of the first region in a case where part of the first region and part of the second region overlap.

12. A method of an apparatus including a device configured to acquire an image signal by photoelectrically converting a light beam of a subject that has entered via an optical system,
setting a first region in the image signal;
detecting a defocus amount for a plurality of regions in the image signal;
detecting a second region as a region of a specific subject, based on the image signal;
controlling the focus lens based on the defocus amount included in the second region in a case where the first region and the second region overlap; and
controlling the focus lens based on the defocus amount included in the first region in a case where the first region and the second region do not overlap.

13. The method according to claim 12, wherein a display format of an index indicating a region is varied between a case where the second region is an in-focus region and a case where the second region is not an in-focus region.

14. The method according to claim 12, wherein, in a case where an overlap region in which the first region and the second region overlap is larger than a predetermined size, it is determined that the first region and the second region overlap.

15. The method according to claim 14, wherein the predetermined size is a size corresponding to (i) one of divided regions obtained by dividing a region in the image signal into the plurality of regions, (ii) a focal length of the optical system, or (iii) a moving speed of a specific subject detected by the detection unit.

16. The method according to claim 12, further comprising predicting a defocus amount at a subject position from a history of an image plane position of a subject.

17. The method according to claim 12, further comprising controlling the focus lens based on the defocus amount included in the second region that does not overlap with part of the first region in a case where part of the first region and part of the second region overlap.

18. A non-transitory computer readable storage medium storing a computer-executable program of instructions for causing a computer to perform a method of an apparatus including a device configured to acquire an image signal by photoelectrically converting a light beam of a subject that has entered via an optical system, the method comprising:
setting a first region in the image signal;

detecting a defocus amount for a plurality of regions in the image signal;

detecting a second region as a region of a specific subject, based on the image signal;

controlling the focus lens based on the defocus amount included in the second region in a case where the first region and the second region overlap; and controlling the focus lens based on the defocus amount included in the first region in a case where the first region and the second region do not overlap.

19. The non-transitory computer readable storage medium according to claim 18, wherein a display format of an index indicating a region is varied between a case where the second region is an in-focus region and a case where the second region is not an in-focus region.

20. The non-transitory computer readable storage medium according to claim 18, wherein, in a case where an overlap region in which the first region and the second region overlap is larger than a predetermined size, it is determined that the first region and the second region overlap.

21. The non-transitory computer readable storage medium according to claim 20, wherein the predetermined size is a size corresponding to (i) one of the divided regions, (ii) a focal length of the optical system, or (iii) a moving speed of a specific subject detected by the detection unit.

22. The non-transitory computer readable storage medium according to claim 18, further comprising predicting a defocus amount at a subject position from a history of an image plane position of a subject.

23. The non-transitory computer readable storage medium according to claim 18, further comprising controlling the focus lens based on the defocus amount included in the second region that does not overlap with part of the first region in a case where part of the first region and part of the second region overlap.

* * * * *